(12) United States Patent
Zhang et al.

(10) Patent No.: US 8,340,198 B2
(45) Date of Patent: Dec. 25, 2012

(54) PREPROCESSING METHOD, BASE STATION, AND SYSTEM FOR COOPERATIVE COMMUNICATION

(75) Inventors: Gong Zhang, Shenzhen (CN); Yi Long, Beijing (CN); Lujia Pan, Shenzhen (CN); Yunbo Li, Shenzhen (CN); Cheng He, Shenzhen (CN); Xun Yang, Shenzhen (CN)

(73) Assignee: Huawei Technologies Co., Ltd., Shenzhen (CN)

(\*) Notice: Subject to any disclaimer, the term of this patent is extended or adjusted under 35 U.S.C. 154(b) by 0 days.

(21) Appl. No.: 13/352,349

(22) Filed: Jan. 18, 2012

(65) Prior Publication Data
US 2012/0114062 A1    May 10, 2012

Related U.S. Application Data

(63) Continuation of application No. PCT/CN2010/073366, filed on May 29, 2010.

(30) Foreign Application Priority Data

Jul. 20, 2009   (CN) .......................... 2009 1 0108823

(51) Int. Cl.
*H04L 25/08* (2006.01)
*H04W 24/00* (2009.01)
*H04B 1/10* (2006.01)

(52) U.S. Cl. ..................... 375/259; 455/456.5; 455/63.1

(58) Field of Classification Search .................. 375/144, 375/148, 259, 260, 267; 455/456.1, 456.2, 455/456.5, 456.6, 500, 501, 63.1, 69
See application file for complete search history.

(56) References Cited

U.S. PATENT DOCUMENTS

| | | | |
|---|---|---|---|
| 7,272,359 B2 | 9/2007 | Li et al. | |
| 2007/0072570 A1 | 3/2007 | Hottinen et al. | |
| 2007/0248172 A1 | 10/2007 | Mehta et al. | |
| 2009/0215480 A1* | 8/2009 | Kim et al. | 455/501 |
| 2010/0034151 A1* | 2/2010 | Alexiou et al. | 370/329 |
| 2011/0255625 A1* | 10/2011 | Song et al. | 375/267 |

FOREIGN PATENT DOCUMENTS

| | | |
|---|---|---|
| CN | 1298576 A | 6/2001 |
| CN | 1780173 A | 5/2006 |
| CN | 1838558 A | 9/2006 |
| CN | 1946000 A | 4/2007 |

(Continued)

OTHER PUBLICATIONS

International search report for International application No. PCT/CN2010/073366, dated Sep. 2, 2010, total 4 pages.

(Continued)

*Primary Examiner* — Young T. Tse

(74) *Attorney, Agent, or Firm* — Huawei Technologies Co., Ltd.

(57) ABSTRACT

A preprocessing method for cooperative communication and a base station and a system for executing the method are provided. The method includes: obtaining a common base station group from a cooperative base station group of a user terminal, in which the common base station group includes a set of base stations providing a cooperative service for other user terminals in the cooperative base station group; and calculating a first precoding matrix of the user terminal according to the common base station group, in which the first precoding matrix is used to perform elimination preprocessing on interference from the user to other user terminals served by the common base station group. The method reduces Multi-User Interference (MUI).

20 Claims, 11 Drawing Sheets

FOREIGN PATENT DOCUMENTS

| | | |
|---|---|---|
| CN | 101159462 A | 4/2008 |
| CN | 101361289 A | 2/2009 |
| CN | 101373998 A | 2/2009 |
| EP | 2182663 A1 | 5/2010 |

OTHER PUBLICATIONS

Francescantonio Della Rosa:"Cooperative Mobile Positioning and Tracking in Hybrid WiMAX/WLAN Networks",dated Jun. 2007,total 60 pages.

Marios Kountouris:"The cardinal role of Scheduling in Downlink Multiuser MIMO Systems",dated May 1, 2007,total 69 pages.

Search report issued in corresponding European patent application No. EP10801900.1 , dated May 23,2012, total 9 pages.

Mitsubishi Electric:"Leakage-based precoding for CoMP in LTE-A"3GPP Draft ;R1-090596,3rd Generation Partnership Project (3GPP) ,Mobile Competence Centre; 650, Route Des Lucioles; F-06921 Sophia-Antipolis Cedex ; France ,no .Athens,Greece ;Feb. 3, 2009 ,XP050338738,[retrieved on Feb. 3, 2009].

CMCC: "Downlink CoMP-MU-MIMO transmission Schemes", 3GPP Draft; R1-090922, 3rd Generation Partnership Project (3GPP), Mobile Competence Centre; 650, Route Des Lucioles; F-06921 Sophia-Antipolis Cedex; France,no Athens,Greece; Feb. 6, 2009, XP050318763, [retrieved on Feb. 6, 2009].

"Combination of unitary precoding with non-unitary tracking ", 3GPP Draft; R1-063244, 3rd Generation Partnership Project (3GPP), Mobile Competence Centre; 650, Route Des Lucioles; F-06921 Sophia-Antipolis Cedex; France,vol. RAN WG1, no Riga, Latvia; Nov. 1, 2006, XP05013695, [retrieved on Nov. 1, 2006].

Alcatel-Lucent Shanghai Bell et al: A progressive multi-cell MIMO transmission with sequential linear lprecoding design in DL TDD systems:, 3GPP Draft ; R1-092147 A Progressive Multi-Cell MIMO With Sequential Linear Precoding, 3rd Generation Partnership Project (3GPP), Mobile Competence Centre ; Sophia-Antipolis Cedex; France, no . San Francisco, USA; Apr. 28, 2009 , XP050339590,[retrieved on Apr. 28, 2009].

\* cited by examiner

PREPROCESSING METHOD, BASE STATION, AND SYSTEM FOR COOPERATIVE COMMUNICATION

CROSS-REFERENCE TO RELATED APPLICATIONS

This application is a continuation of International Application No. PCT/CN2010/073366, filed on May 29, 2010, which claims priority to Chinese Patent Application No. 200910108823.5, filed on Jul. 20, 2009, both of the aforementioned patent applications are hereby incorporated by reference in their entireties.

FIELD OF THE INVENTION

The present invention relates to the field of communications, and in particular, to a preprocessing method, a base station (BS), and a system for cooperative communication.

BACKGROUND OF THE INVENTION

A so-called Cooperative Multiple-Input Multiple-Output (Co-MIMO) technology has been considered as a key physical layer technology in International Mobile Telecommunications-Advanced (IMT-Advanced) standard. In a global scale frequency multiplexing cellular system, inter-cell interference has become a main factor that may limit the performance of mobile communications. A basic concept of the Co-MIMO is to coordinate signal transmission of multiple base stations, so as to reduce the inter-cell interference. In a Co-MIMO system, multiple base stations cooperatively provide a communication service for multiple user terminals (i.e. mobile stations) at the same time.

In a Co-MIMO system, when a base station sends data to multiple user terminals, a multi-user interference (MUI) may be generated. Meanwhile, when a user terminal receives data sent by multiple base stations, an inter-cell interference may be generated. Though the current Co-MIMO system may reduce the inter-cell interference to some extent in a conventional precoding manner based on a codebook, solutions for reducing the MUI have not been provided.

SUMMARY OF THE INVENTION

The present invention provides a preprocessing method, a base station, and a system for cooperative communication, in which a precoding matrix for a user terminal is designed according to a common base station group of the user terminal, so as to reduce the MUI.

In a first aspect of the present invention, a preprocessing method for cooperative communication is provided, wherein the method includes:

obtaining a common base station group from a cooperative base station group of a user terminal, in which the common base station group includes a set of base stations providing a cooperative service for other user terminals in the cooperative base station group of the user terminal; and calculating a first precoding matrix of the user terminal according to the common base station group, in which the first precoding matrix is used to perform elimination preprocessing on interference from the user terminal to other user terminals served by the common base station group.

In a second aspect of the present invention, a base station is provided, wherein the base station includes:

an obtaining module, configured to obtain a common base station group from a cooperative base station group serving a user terminal, in which the common base station group includes a set of base stations providing a cooperative service for other user terminals in the cooperative base station group of the user terminal; and a first precoding module, configured to calculate a first precoding matrix of the user terminal according to the common base station group, in which the first precoding matrix is used to perform elimination preprocessing on interference from the user terminal to other user terminals served by the common base station group.

In a third aspect of the present invention, a preprocessing system for cooperative communication is provided, where the system includes at least two base stations and at least one terminal of a user, in which the terminal is configured to communicate with the base stations.

The base stations are configured to obtain a common base station group from a cooperative base station group of the terminal, in which the common base station group includes a set of base stations providing a cooperative service for other terminals in the cooperative base station group of the terminal; and to calculate a first precoding matrix of the terminal according to the common base station group, in which the first precoding matrix is used to perform elimination preprocessing on interference from the terminal to other terminals served by the common base station group.

In the embodiments of the present invention, through the above technical solutions, a common base station group is confirmed in a cooperative base station group of a user terminal, and a final first precoding matrix of the user terminal is calculated according to the common base station group, so that the elimination preprocessing is performed on interference from the user terminal to other user terminals served by the common base station group, which thereby reduces the MUI.

BRIEF DESCRIPTION OF THE DRAWINGS

To illustrate the technical solutions according to the embodiments of the present invention or in the prior art more clearly, the accompanying drawings describing the embodiments or the prior art are introduced below briefly. Apparently, the accompanying drawings in the following descriptions merely show some of the embodiments of the present invention, and persons skilled in the art may obtain other drawings according to the accompanying drawings without creative efforts.

DETAILED DESCRIPTION

The technical solutions of the embodiments of the present invention are clearly and comprehensively described below with reference to the accompanying drawings. Apparently, the embodiments in the following descriptions are merely a part of the embodiments of the present invention, rather than all the embodiments of the present invention. Persons skilled in the art may derive other embodiments based on the described embodiments of the present invention without creative efforts, and these other embodiments shall fall within the protection scope of the present invention.

Figure 1:
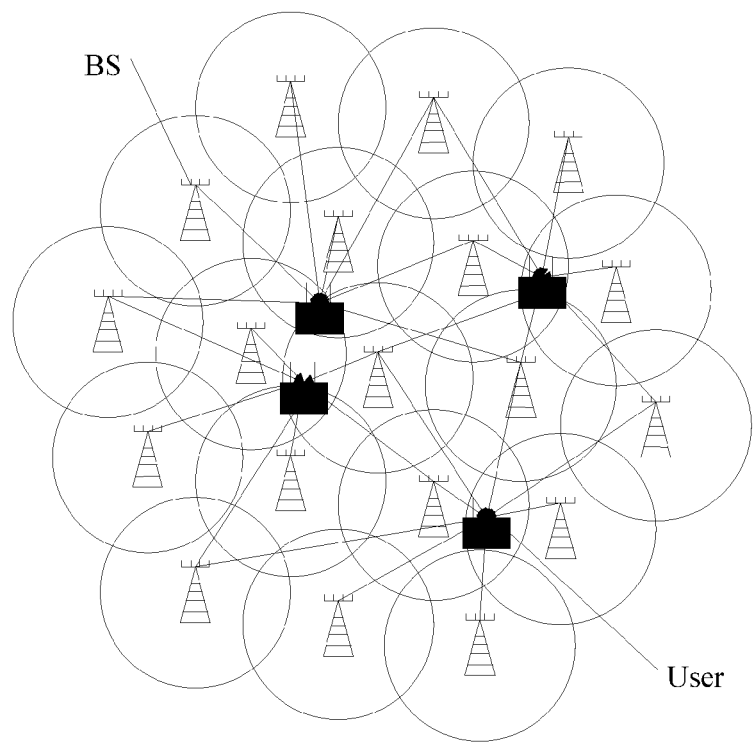
FIG. 1 is a schematic view of a general model of a Co-MIMO system according to an embodiment of the present invention.

FIG. 1 is a schematic view of a general model of a Co-MIMO system according to an embodiment of the present invention. It may be known from FIG. 1 that, in the Co-MIMO system, multiple base stations (BSs) cooperatively provide communication services for multiple user terminals or mobile stations (MSs) at the same time. In the Co-MIMO system, each user terminal may receive data streams from multiple antennas. In addition, at the same time, each user terminal may independently receive different data streams, which thereby achieves a high throughput. However, each data stream may be interfered with other data streams in space. Other data streams are defined as: data streams sent to other user terminals, or other data streams sent to this user terminal.

In a downlink, a BS sends data to multiple user terminals, and the MUI may be generated. Meanwhile, a user terminal may receive data sent by multiple BSs, and the inter-cell interference may be generated. At this time, the BS may perform a preprocessing to eliminate the interference before transmitting signals. If the preprocessing only uses the information of a receiver, the interference elimination may face a problem that coordination information between the user terminals is insufficient. Therefore, the interference elimination in a downlink is more difficult than that in an uplink.

Figure 2:
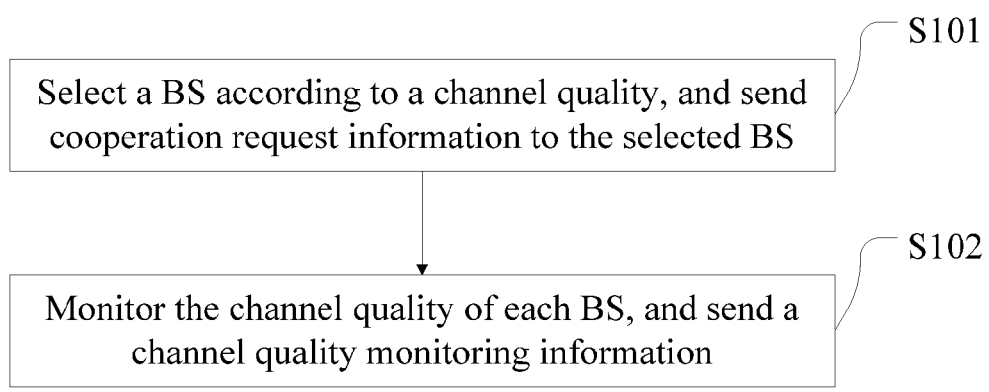
FIG. 2 is a flowchart of a preprocessing method for cooperative communication according to an embodiment of the present invention.

As shown in FIG. 2, an embodiment of the present invention provides a preprocessing method for cooperative communication, and the method is applied to a Co-MIMO system shown in FIG. 1 or other communication systems, such as a Multiple Input Multiple Output-Orthogonal Frequency Division Multiplexing (MIMO-OFDM) system, a Long Term Evolution (LTE) system, or a Worldwide Interoperability for Microwave Access (WiMAX) system. The method includes the following steps.

S101: Select a BS according to a channel quality, and send cooperation request information to the selected BS, wherein the cooperation request information is used to determine a cooperative BS group.

In this embodiment, each channel refers to a channel between an MS and each BS. In an instance, differences of the channel quality may be reflected in differences of such information as a path loss, a signal-to-noise ratio (SNR) or a signal to noise and distortion ratio (SINAD) obtained or received at the MS side through channel measurement or estimation.

In one instance, an MS may select a channel with the best channel quality, and send cooperation request information to a BS corresponding to the channel. The BS accepts a cooperation request of the MS (that is, acting as a cooperative BS of the MS) in a suitable condition, and selects a number N of BSs that are closest to the BS itself as cooperative BSs of the MS, wherein the cooperative BSs constitute a cooperative BS group of the MS. N is a number preset according to a bearing capability of the user terminal, and is a positive integer.

In another instance, an MS may select a number N of channels with the best channel quality, and send cooperation request information to N BSs corresponding to the N channels. After receiving the cooperation request information, each BS among the N BSs may determine whether to accept a cooperation request of the MS according to its own and surrounding conditions, and if the BS accepts the cooperation request of the MS, the BS is a cooperative BS of the MS, and all cooperative BSs of the MS constitute a cooperative BS group of the MS.

S102: Monitor the channel quality of each BS, and send a channel quality monitoring result, in which the channel quality monitoring result is used to update the cooperative BS group determined in step S101.

After the cooperative BS group is determined in the step S101, the MS may continue to monitor the channel quality of each BS corresponding to wireless signals that may be received, and send a channel quality monitoring result, in which the channel quality monitoring result includes the quality condition of each channel. At the BS side, the previous cooperative BS group is updated according to the channel quality monitoring result, so as to ensure that the channel quality of the BS in the cooperative BS group is relatively good. For example, the quality of the channel between the BS cooperating with the MS in a previous cycle may be deteriorated in a next cycle due to a position change of the MS, then the MS feeds back such a situation to the BS side, and the BS side discontinues the cooperative relation between the BS and the MS.

After the cooperative BS group is updated, the BS side may calculate BS precoding of the MS according to the cooperative BS group of the MS, in which the BS precoding is used to perform interference preprocessing on the MS.

In this embodiment of the present invention, through the above technical solution, a user terminal-centered resource scheduling is performed, to serve a MS user more effectively by taking the requirements and experience of the user and the current network resource condition into account; and a user terminal-centered real-time update is dynamically performed on a cooperative BS group, to dynamically expand the cooperative BS group. In addition, BS precoding of the MS is calculated according to the cooperative BS group and channel state information of the MS, so that the user obtains a great cooperation benefit.

Figure 3:
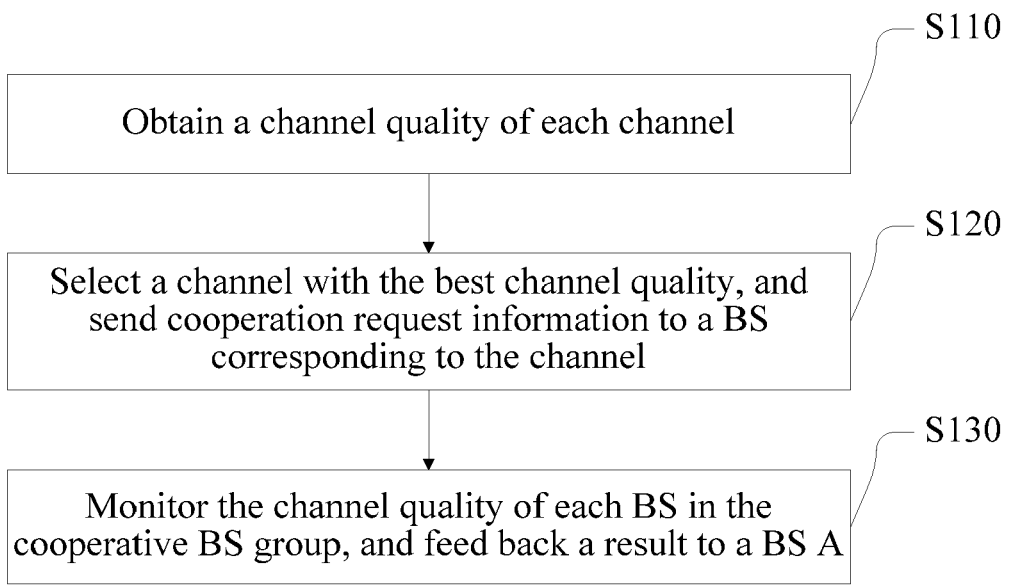
FIG. 3 is a flowchart of a preprocessing method for cooperative communication according to an embodiment of the present invention.

As shown in FIG. 3, an embodiment of the present invention provides a preprocessing method for cooperative communication, and the method is applied to a Co-MIMO system shown in FIG. 1 or other communication systems, such as a MIMO-OFDM system, a LTE system, or a WiMAX system. The method includes the following steps.

S110: An MS obtains a channel quality for each of a plurality of channels.

In this embodiment, a channel refers to a channel between the MS and a BS. Differences of the channel quality may be reflected in differences of such information as a path loss, a SNR or a signal to noise and distortion ratio (SINAD) obtained through channel estimation or measurement obtained at the MS side.

In one instance, an MS may perform a channel estimation according to received information sent by a BS, so as to obtain a channel quality of this channel. The channel estimation may be obtained by estimating a model parameter of an assumed channel model according to received data, and according to the estimated model parameter of the channel model, channel state information that is required by a receiving end may be provided.

In another instance, an MS may also measure a channel quality of each BS according to received wireless signal information of each BS, so as to obtain a quality condition of each channel. A measurement parameter may be determined according to actual network deployment. For example, an SNR may be taken as a measurement parameter, or an SINR may be taken as a measurement parameter.

S120: Select a channel with the best channel quality, and send cooperation request information to a BS corresponding to the channel, wherein the cooperation request information is used to enable the BS corresponding to the channel to confirm a cooperative BS group.

In the step S110, the MS may obtain the channel qualities of the channels between the MS and each BS in the manner of channel estimation or measurement, and at this time, the MS may select a channel with the best channel quality from the channels, and send cooperation request information to the BS corresponding to the channel. In the following embodiments of the present invention, the BS corresponding to the channel with the best channel quality is referred to as a base station A (BS A) for the convenience of description.

In this embodiment, the cooperation request information is used to enable the BS A to confirm a cooperative BS group. After receiving the cooperation request information sent by the MS, the BS A determines whether to accept a cooperation request of the MS according to its own and surrounding conditions (such as radio resources or cooperation conditions). If the radio resources surrounding the BS A are insufficient, for instance, the surrounding BSs are rare, the BS A may not accept the cooperation request of the MS; or, if the cooperation conditions are harsh, for instance, too many barriers exist between the BS A and the surrounding BSs, or channels between the BS A and the surrounding BSs are harsh, the BS A may not accept the cooperation request of the MS. When the BS A does not accept the cooperation request of the MS, the BS A feeds back a result to the MS, so as to enable the MS to continue to send the cooperation request to another BS with the best channel quality.

When its own and surrounding conditions are suitable, the BS A accepts the cooperation request of the MS, selects a number N of BSs that are closest to the BS A itself as a cooperative BS group, and notifies the MS of the result.

Herein, N is a preset numerical value, and is a positive integer. In an embodiment, N may be set according to a bearing capability of the MS. The MS has an upper limit for receiving signals, and when the number of signals exceeds the upper limit, not all of the signals may be received by the MS. For example, the MS may receive signals sent by ten BSs simultaneously, and then, if eleven BSs send signals to the MS at same time, the MS may only receive the signals from ten of the eleven BSs. Clearly, it is understandable that, in another instance, the number N may also be set according to network planning, for example, according to a reasonable allocation of BS antennas or related technical requirements adopted by the BS for sending information.

It should be noted that, in all the following embodiments of the present invention, the meaning of the number N is the same as defined above.

For example, in an embodiment, the BS A receives cooperation request information sent by the MS, and selects three BSs: BS B, BS C, and BS D that are closest to the BS A itself, so a cooperative BS group includes the BS A, the BS B, the BS C, and the BS D is established. After the cooperative BS group is determined, the BS may notify the MS of the result. Clearly, in another embodiment, the BS A may also select seven or nine BSs that are closest to the BS A itself according to different bearing capabilities of the MS, and the selected BSs together with the BS A are taken as a cooperative BS group of the MS.

S130: The MS monitors the channel qualities of BSs according to signals it received, and feeds back a channel quality monitoring result to the BS A, in which the result is used to enable the BS A to update the cooperative BS group.

It should be noted that, in an embodiment, step S130 is a possible situation of step S102 in the embodiment shown in FIG. 2.

After the BS A determines a cooperative BS group and notifies the MS of the result, the MS may continue to monitor the channel qualities of the BSs according to the signals it received, and feed back a channel quality monitoring result to the BS A, in which the channel quality monitoring result includes a quality condition of each channel.

After receiving the channel quality monitoring result fed back by the MS, the BS A may update the cooperative BS group according to channel quality conditions of the BSs included in the result.

Specifically, in an embodiment, two thresholds that respectively are a first threshold and a second threshold may be set. When the channel quality of a certain BS is lower than the first threshold, it indicates that the channel quality of the BS is very poor. Therefore, in order to ensure a cooperation quality, the BS A removes the BS from the cooperative BS group.

The second threshold is set to avoid a difference between the channel quality of the BS with the best channel quality and the channel quality of the BS with the worst channel quality in a cooperative BS group being too large, so as to ensure a cooperation quality. For the convenience of description, a channel quality information value of the channel with the worst channel quality is referred to as a, and a channel quality information value of the channel with the best channel quality is referred to as b. In an instance, a ratio of a logarithmic value of a to a logarithmic value of b is compared with the second threshold, and if the ratio is smaller than the second threshold, a BS corresponding to a is removed from the cooperative BS group. In another instance, a difference between a and b is compared with the second threshold, and if the difference is smaller than the second threshold, the BS corresponding to a is removed from the cooperative BS group. In another embodiment, a ratio of a to b may also be compared with the second threshold, and if the ratio is smaller than the second threshold, the BS corresponding to a is removed from the cooperative BS group. Clearly, other comparison manners may also be adopted, which are not specifically defined in this embodiment of the present invention.

After the cooperative BS group is updated, BS precoding of an MS is calculated at the BS side according to the cooperative BS group of the MS, in which the BS precoding is used to perform interference preprocessing on the MS. If a new user terminal joins, the BS side may further take statistics on the user terminals that need to be precoded again (that is, updating the precoding) due to the joining of the new user terminal, and update the precoding for the user terminals.

In this embodiment of the present invention, through the above technical solution, user terminal-centered resource scheduling is performed, so as to serve a user of the terminal more effectively by taking the requirements and experience of the user and the current network resource condition into account; real-time update is dynamically performed on a cooperative BS group based on a user terminal-centered cooperative BS transmission policy, to dynamically expand the cooperative BS group, and the user terminals needed to be precoded again due to the joining of a new user terminal are precoded again, so as to support multiple user terminals. The BS precoding of an MS is calculated according to the cooperative BS group of the MS, which may effectively eliminate inter-BS interference inside the cooperative BS group and interference at the cooperative BS group edge, so that the user obtains a great cooperation benefit.

Figure 4:
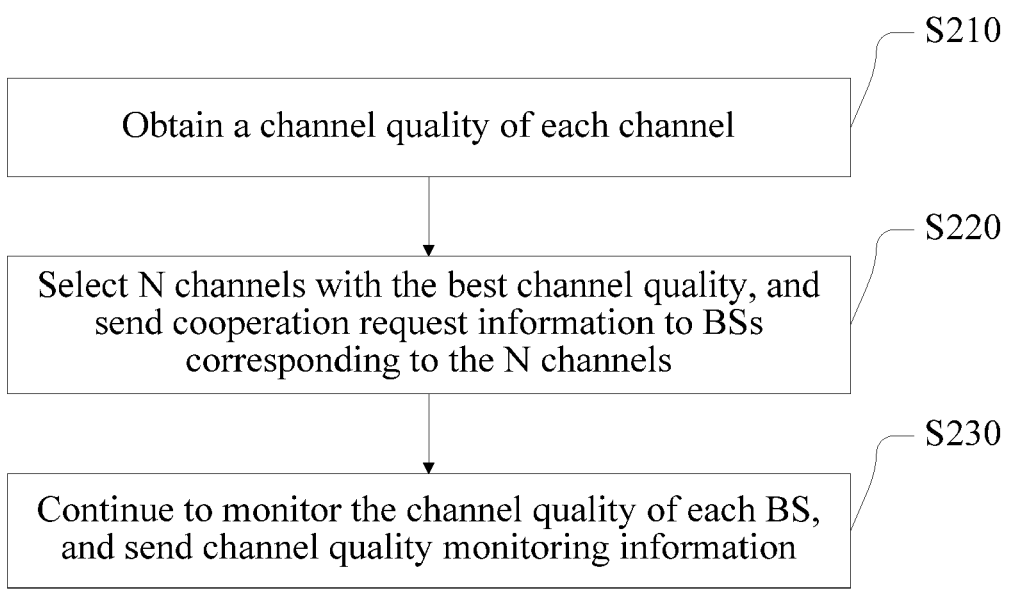
FIG. 4 is a flowchart of a preprocessing method for cooperative communication according to an embodiment of the present invention.

As shown in FIG. 4, an embodiment of the present invention provides a preprocessing method for cooperative communication, and the method is applied to a Co-MIMO system shown in FIG. 1 or other communication systems, such as an MIMO-OFDM system, an LTE system, or a WiMAX system. The method includes the following steps.

S210: An MS obtains a channel quality of each channel.

In this embodiment, "each channel" refers to a channel between the MS and each of a plurality of BSs. In an instance, differences of the channel quality may be reflected in differences of such information as a path loss, an SNR or an SINR obtained through channel measurement or estimation at the MS side.

It should be noted that, in an instance, the MS may obtain the channel quality of each channel according to channel estimation. In another instance, the MS may also measure the channel quality of each BS according to received wireless signal information of each BS, so as to obtain the quality condition of each channel. A measurement parameter may be determined according to actual network deployment. The specific step has been described in detail in conjunction with step S110 in the embodiment shown in FIG. 2, and is not described in detail herein again.

S220: Select a number N of channels with the best channel quality, and send cooperation request information to the N BSs corresponding to the N channels, in which the cooperation request information is used to request the N BSs to act as a cooperative BS group of the MS, that is, the cooperation request information is used to enable the N BSs to confirm a cooperative BS group.

In step S110, the MS may obtain the channel qualities of channels between the MS and the BSs in the manner of channel estimation or measurement, and at this time, the MS may select N channels with the best channel quality from the channels, and send the cooperation request information to the N BSs corresponding to the N channels.

After receiving the cooperation request information sent by the MS, each BS among the N BSs determines whether to accept the cooperation request of the MS according to its own and surrounding conditions (such as radio resources or cooperation conditions). For example, if a certain BS has a large load, the BS may not accept the cooperation request of the MS; or, if the cooperation conditions are harsh, for instance, too many barriers exist between the BS and surrounding BSs, or channels between the BS and the surrounding BSs are harsh, the BS also may not accept the cooperation request of the MS. When its own and surrounding conditions of a certain BS are suitable, the BS accepts the cooperation request of the MS, and acts as a cooperative BS of the MS, in which all cooperative BSs constitute a cooperative BS group of the MS.

In an instance, if all the N BSs accept the cooperation request of the MS, the N BSs constitute a cooperative BS group, and notify the MS of the result. Clearly, in another instance, some BSs among the N BSs may reject the cooperation request of the MS because their own or surrounding conditions are unsuitable (for example, their own loads are too large or the surrounding resources are insufficient), and then, the remaining BSs that receive the cooperation request information of the MS may constitute a cooperative BS group, and notify the MS of the result. In this embodiment, the number of the BSs in the cooperative BS group does not affect the implementation of this embodiment of the present invention, and is not specifically limited herein.

S230: The MS continues to monitor the channel quality of each BS corresponding to the signals that may be received, and sends a channel quality monitoring result, in which the channel quality monitoring result is used to enable a BS side to update the cooperative BS group.

It should be noted that, in an instance, step S230 is a possible situation of step S102 in the embodiment shown in FIG. 2.

After the cooperative BS group is determined, the MS may continue to receive signals sent by the BSs, which may include signals of BSs that are not included in the cooperative BS group. The MS may continue to monitor the channel quality of each BS corresponding to the signals that may be received. The MS monitors the channel quality of each BS according to the received signals of the BSs, and feeds back a channel quality monitoring result to the BS side, in which the channel quality monitoring result includes the channel quality condition of each channel. The BS side updates the cooperative BS group according to the channel quality monitoring result. Clearly, in another embodiment, the MS may also obtain the channel quality of each BS that sends the signals in other manners.

Specifically, in an instance, a threshold, which is referred to as a first threshold, may be set. When the channel quality of a certain BS is lower than the first threshold, it indicates that the channel quality of the BS is very poor. Therefore, in order to ensure a cooperation quality, the MS does not send a cooperation request to the BS. After selecting all the BSs with the channel quality higher than the first threshold, the MS selects N BSs with the best channel quality from the BSs, and sends cooperation request information to the N BSs.

After receiving the cooperation request information sent by the MS, each BS among the N BSs determines whether to accept the cooperation request of the MS according to its own and surrounding conditions (such as radio resources or cooperation conditions). The BSs receiving the cooperation request of the MS constitute a cooperative BS group of the MS.

After the cooperative BS group is updated, BS precoding of the MS is calculated at the BS side according to the cooperative BS group of the MS, in which the BS precoding is used to perform interference preprocessing on the MS. If a new user terminal joins, the BS side may further take statistics on user terminals that need to be precoded again (that is, updating the precoding) due to the joining of the new user terminal, and update the precoding for the user terminals.

In this embodiment of the present invention, through the above technical solution, user terminal-centered resource scheduling is performed, so as to serve a user of the terminal more effectively by taking the requirements and experience of the user and the current network resource condition into account; real-time update is dynamically performed on a cooperative BS group based on a user terminal-centered cooperative BS transmission policy, to dynamically expand the cooperative BS group, and the user terminals that need to be precoded again due to the joining of a new user terminal are precoded again, so as to support multiple user terminals. The BS precoding of the MS is calculated according to the cooperative BS group of the MS, which may effectively eliminate inter-BS interference inside the cooperative BS group and interference at the cooperative BS group edge, so that the user obtains a great cooperation benefit.

Figure 5:
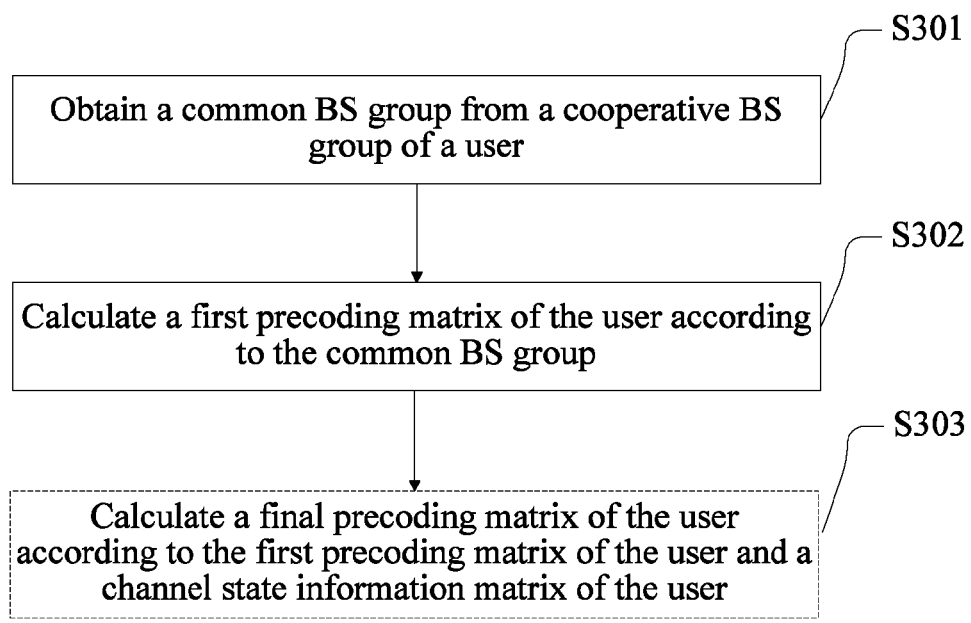
FIG. 5 is a flowchart of a preprocessing method for cooperative communication according to an embodiment of the present invention.

As shown in FIG. 5, an embodiment of the present invention provides a preprocessing method for cooperative communication, and the method is applied to a Co-MIMO system shown in FIG. 1 or other communication systems, such as an MIMO-OFDM system, an LTE system, or a WiMAX system. The method includes the following steps.

S301: Obtain a common BS group from a cooperative BS group of a user terminal, wherein the common BS group includes a set of BSs providing a cooperative service for other user terminals in the cooperative BS group.

S302: Calculate a first precoding matrix of the user terminal according to the common BS group, in which the first precoding matrix is used to perform elimination preprocessing on interference from the user terminal to other user terminals served by the common BS group.

In this embodiment, the common BS group refers to a set of BSs in the cooperative BS group that is providing cooperative service(s) for other user terminals, that is, a set of BSs sharing resources for multiple user terminals. In contrast to the common BS group, the remaining BSs in the cooperative BS group constitute a private BS group. That is to say, the private BS group refers to a set of BSs in the cooperative BS group cooperating with only one user terminal. After the common BS group is determined, the remaining BSs in the cooperative BS group constitute the private BS group.

In this embodiment of the present invention, through the above technical solution, a common BS group is confirmed in a cooperative BS group of a user terminal, and a first precoding matrix of the user terminal is calculated in the common BS group, so that elimination preprocessing is performed for the interference from the user terminal to other user terminals served by the common BS group, which thereby reduces the MUI.

In another embodiment, as shown in the dashed box of FIG. 5, the method may further include the following step.

S303: Calculate a final precoding matrix of the user terminal according to the first precoding matrix of the user terminal and a channel state information matrix of the user terminal, wherein the final precoding matrix is used to perform interference elimination preprocessing on information of the user terminal.

Figure 16:
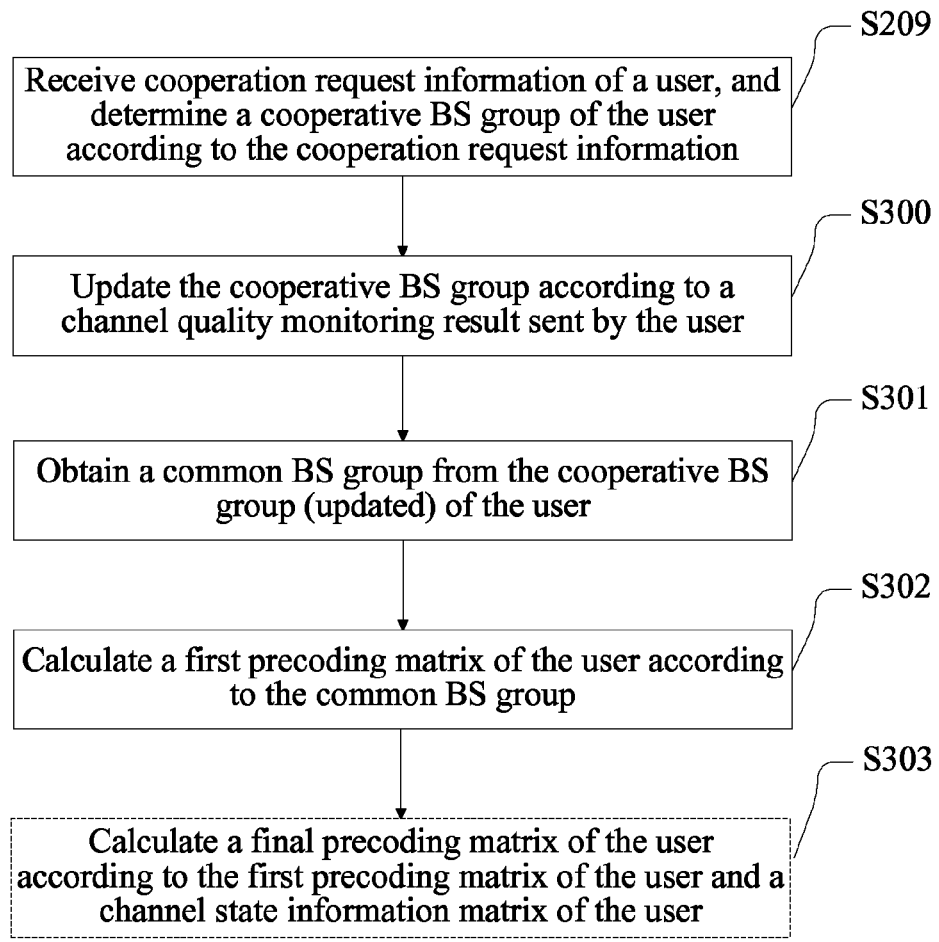
FIG. 16 is a flowchart of a preprocessing method for cooperative communication according to an embodiment of the present invention.

In another embodiment, as shown in FIG. 16, the method may further include the following steps.

S209: Receive cooperation request information of the user terminal, and determine a cooperative BS group of the user terminal according to the cooperation request information.

S300: Update the cooperative BS group according to a channel quality monitoring result sent by the user terminal.

After the cooperative BS group of the MS is determined, the BS may schedule time-frequency resources (such as, performing radio resource scheduling, and channel detection and feedback), and determine a common BS group and a private BS group from the cooperative BS group of the MS.

Specifically, in an embodiment, the common BS group may be determined in the following manner.

The set of BSs providing a cooperative service for other user terminals, that is, the set of BSs sharing resources for multiple user terminals in the common BS group, is found from the cooperative BS group of the user terminal.

The set of BSs providing a cooperative service for other user terminals is determined as the common BS group of the user terminal.

Specifically, in an embodiment, a final precoding matrix of the MS may be calculated in the following processes.

a) Calculate, according to the common BS group, interference from the MS to other MSs served by the common BSs in the common BS group, so as to obtain preprocessing constraint conditions for completely eliminating or reducing the interference, a precoding matrix design is performed, and interference elimination preprocessing is performed.

In this embodiment, the common BS group refers to a set of common BSs sharing the resources for multiple user terminals in the cooperative BS group. In contrast to the common BS group, the remaining BSs in the cooperative BS group constitute a private BS group. That is to say, a private BS group refers to the set of BSs cooperating with only one user terminal in the cooperative BS group. After the common BS group is determined, the remaining BSs in the cooperative BS group constitute the private BS group.

In an instance, the preprocessing constraint conditions may be obtained by deriving a null space through singular value decomposition (SVD). In another instance, a Householder pseudo upper-triangular decomposition may be adopted. In still another instance, the preprocessing constraint conditions may be obtained by deriving a null space through Gram-Schmidt orthogonalization or a generalized inverse solution.

b) Perform the precoding matrix design again according to the preprocessing constraint conditions (such as the null space) obtained in step a) in combination with the channel state information of the MS, that is, perform a final precoding matrix design, and implement interference elimination preprocessing.

Clearly, in other instances, the precoding design may be performed through, for example, a zero-forcing linear precoding algorithm; or, the precoding design may be performed through a non-linear precoding algorithm, such as a dirty paper coding algorithm, a non-linear transmission zero-forcing precoding algorithm, or a Tomlinson-Harashima Precoding (THP) algorithm.

It should be noted that, in this embodiment, the step a) is mainly used to eliminate or reduce the interference between the MS and other user terminals, and the step b) is mainly used to eliminate interference of data sent by different antennas of one BS to the MS.

In other words, in a Co-MIMO system, each MS may receive data streams of multiple antennas. In addition, at the same time, each MS may independently receive different data streams, and each data stream may be interfered with other data streams in space. The other data streams are defined as: the data streams sent to other user terminals (which may cause the MUI), or the other data streams sent to this user terminal (which may cause the inter-cell interference). Step a) is mainly directed to eliminate or reduce the interference of the data streams sent to the other user terminals, that is, to perform elimination preprocessing on the MUI. Based on a result of the step a), the step b) is directed to eliminate or reduce the interference of the other data streams sent to this user terminal, and further perform elimination preprocessing on the MUI.

Clearly, in another embodiment, the step S303 may also be as follows. A second precoding matrix of the user is calculated according to the channel state information matrix of a user terminal, instead of using the first precoding matrix calculated in the step S302 (for example, the second precoding matrix of the user terminal may be calculated by obtaining a null space of the channel state information matrix). Then, a final precoding matrix is constructed according to the second precoding matrix and the first precoding matrix, so as to perform interference preprocessing on the information of the user terminal. The effect of step S305 may also be achieved in this way. Since the second precoding matrix is not calculated based on the first precoding matrix, the second precoding matrix is only used to perform elimination preprocessing on the inter-cell interference (i.e. inter-BS interference).

In this embodiment of the present invention, through the above technical solution, user terminal-centered resource scheduling is performed, so as to serve a user of the terminal more effectively by taking the requirements and experience of the user and the current network resource condition into account; and real-time update is dynamically performed on a cooperative BS group based on a user terminal-centered cooperative BS transmission policy, to dynamically expand the cooperative BS group. The common BS group is confirmed in the cooperative BS group of the user terminal, and the final precoding matrix of the user terminal is calculated according to the precoding matrix of the user terminal in the common BS group, which thereby reduces the calculation complexity. Moreover, the interference preprocessing is performed on the information of the user terminal by precoding the user terminal, which thereby reduces the MUI and the inter-cell interference.

Figure 6:
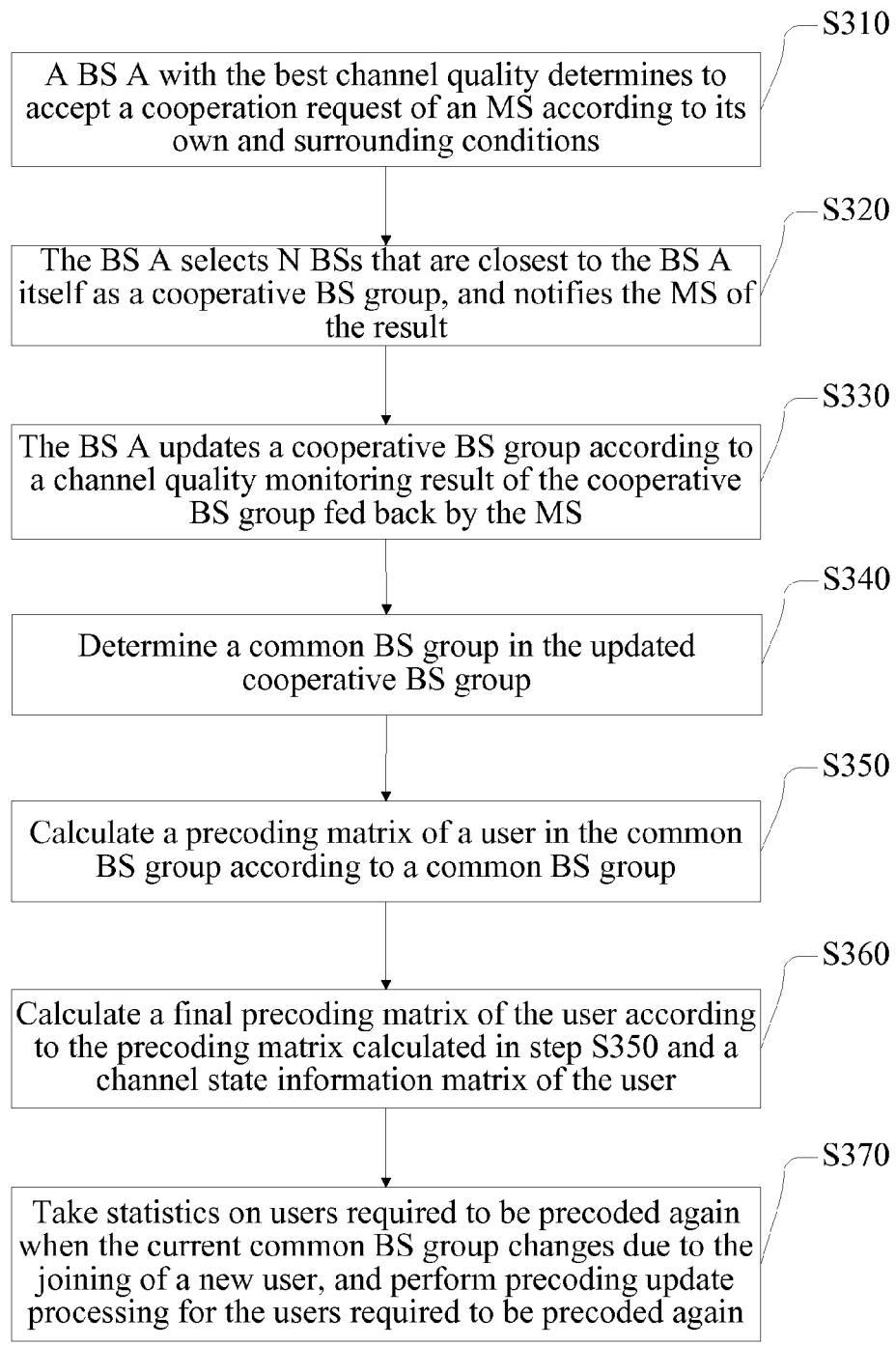
FIG. 6 is a flowchart of a preprocessing method for cooperative communication according to an embodiment of the present invention.

As shown in FIG. 6, an embodiment of the present invention provides a preprocessing method for cooperative communication, and the method is applied to a Co-MIMO system shown in FIG. 1 or other communication systems, such as an MIMO-OFDM system, an LTE system, or a WiMAX system. The method includes the following steps.

S310: A BS A with the best channel quality determines to accept a cooperation request of an MS according to its own and surrounding conditions.

In an instance, differences of the channel quality may be reflected in differences of such information as a path loss, an SNR or an SINR obtained through channel measurement and estimation or received at the MS side. In an instance, an MS may obtain a channel quality of each channel according to channel estimation. In another instance, an MS may also measure a channel quality of each BS according to received wireless signal information of each BS, so as to obtain a quality condition of each channel. A measurement parameter may be determined according to actual network deployment.

For the convenience of description, the BS with the best channel quality herein is referred to as the BS A. In this embodiment, at the MS side, the MS may obtain the channel quality of each BS according to channel estimation based on the received wireless signal information of each BS. The MS selects a BS with the best channel quality, that is, the BS A, and sends cooperation request information to the BS A.

After receiving the cooperation request information of the MS, the BS A may determine whether to accept the cooperation request of the MS according to its own and surrounding conditions (such as radio resources or cooperation conditions). If the radio resources surrounding the BS A are insufficient, for instance, the surrounding BSs are rare, the BS A may not accept the cooperation request of the MS; or, if the cooperation conditions are harsh, for instance, too many barriers exist between the BS A and the surrounding BSs, or channels between the BS A and the surrounding BSs are harsh, the BS A may not accept the cooperation request of the MS. When its own and surrounding conditions are suitable, the BS A accepts the cooperation request of the MS, and acts as a cooperative BS of the MS.

S320: The BS A selects a number N of BSs that are closest to the BS A itself as a cooperative BS group, and notifies the MS of the result.

After accepting a cooperation request of the MS, the BS A may select N BSs that are closest to the BS A itself, in which the selected BSs are taken as the cooperative BS group of the MS together with the BS A, and notify the MS of the result, that is, notify the MS of which BSs cooperate with the MS.

Herein, N is a number preset according to a bearing capability of the MS. The reason why N is set according to the bearing capability of the MS is that, the MS has an upper limit for the number of signals it may receive, and when the number of signals exceeds the upper limit, the MS may not receive all the signals. For example, in an embodiment, the MS may receive signals sent by ten BSs simultaneously, and then, if eleven BSs send signals to the MS at same time, the MS may only receive the signals from ten of the eleven BSs.

S330, The BS A updates a cooperative BS group according to a channel quality monitoring result of the cooperative BS group fed back by the MS.

In the step S320, after the BS A determines the cooperative BS group and notifies the MS of the result, the MS may continue to monitor the channel quality of each cooperative BS in the cooperative BS group and feed back the channel quality of each channel to the BS A, that is, feed back a channel quality monitoring result to the BS A. The BS A will update the cooperative BS group according to the channel quality of the cooperative BS group fed back by the MS.

Specifically, in an instance, two thresholds may be set that respectively are a first threshold and a second threshold. When a channel quality of a certain BS is lower than the first threshold, it indicates that the channel quality of the BS is very poor. Therefore, in order to ensure a cooperation quality, the BS A removes the BS from the cooperative BS group.

The second threshold is set to avoid a large difference in channel quality between the S340: Determine a common BS group in the updated cooperative BS group.

In an embodiment, the common BS group may be determined in the following manner.

A set of BSs providing a cooperative service for other user terminals, that is, a set of BSs sharing resources for multiple user terminals in the common BS group, is found from the cooperative BS group of a user terminal. The set of BSs providing a cooperative service for the other user terminals is determined as the common BS group of the user terminal.

In this embodiment, after the cooperative BS group is determined and updated, it also needs to determine the common BS group and a private BS group in the cooperative BS group at a BS side. In this embodiment, the common BS group refers to a set of common BSs sharing the resources for multiple user terminals in the cooperative BS group. In contrast to the common BS group, the private BS group refers to a set of BSs cooperating with only one user terminal in the cooperative BS group. Actually, after the common BS group is determined, the remaining BSs in the cooperative BS group constitute the private BS group. In this embodiment, the common BS group is marked as Bc={BS1, BS2, ..., BSn}, in which n is an integer satisfying the condition of $0 \leq n \leq N$.

For example, in an embodiment, a cooperative BS group of MS1 includes seven BSs, that is to say, seven BSs cooperate with MS1, while three BSs among the seven BSs further cooperate with MS2, so the three BSs constitute a common BS group. In another embodiment, another two BSs further cooperate with MS3, so the two BSs constitute another common BS group. In this way, the remaining two BSs only cooperate with MS1, and are referred to as the private BS group in contrast to the common BS group. It may be seen from above examples that, the common BS group and the private BS group together constitute the cooperative BS group.

S350: Calculate a first precoding matrix of a user terminal according to a common BS group.

Step S350 is used to perform elimination preprocessing on interference from a user terminal to other user terminals served by the common BS group, that is, to reduce interference between the user terminal and other user terminals. Specifically, in an embodiment, step S350 may include the following steps.

S351: Calculate a null space of a channel matrix corresponding to other user terminals in a common BS group Bc, and calculate a first precoding matrix fc of a user terminal according to the null space. The fc herein is used to perform elimination preprocessing on the interference from the user terminal to other user terminals served by the common BS group.

S352: If the precoding fails, mark a failed common BS group, and readjust the common BS group so as to avoid a common BS group the same as the previous common BS group that is marked failure, and recalculate the first precoding matrix of the user terminal according to the readjusted common BS group.

Specifically, if the precoding fails, in an embodiment, the readjusting the common BS group may be re-confirming a cooperative BS group, then determining a new common BS group, and performing the recalculation based on the above steps. In another embodiment, the number of cooperative BSs of a user terminal, that is, the number of the BSs in a cooperative BS group of the user terminal, may be increased, and then the recalculation is perform based on the above step. In an embodiment, whether the precoding fails may be determined according to a result whether the null space of the interference channel matrix of other user terminals is found in step S351, and the precoding fails if the null space is not found.

In step S360, a final precoding matrix of a user terminal is calculated according to the first precoding matrix calculated in step S350 and a channel state information matrix of the user terminal, in which the final precoding matrix is used to perform interference preprocessing on information of the user terminal.

On the basis of eliminating or reducing inter-user terminal interference, step S360 is mainly directed to eliminate or reduce interference of other data streams sent to this user terminal, that is, to eliminate or reduce interference in a cooperative BS group to the MS. Specifically, in an embodiment, step S360 may include the following steps.

S361: Obtain a new matrix based on a product of a channel state information matrix $H_1$ of this user terminal and the first precoding matrix fc, and obtain a null space of the matrix, and calculate a final precoding matrix of the user terminal according to the null space.

In an instance, preprocessing constraint conditions may be obtained by deriving a null space through SVD (singular value decomposition). In another instance, a Householder pseudo upper-triangular decomposition may also be adopted. In still another instance, the preprocessing constraint conditions may also be obtained by deriving a null space through Gram-Schmidt orthogonalization or a generalized inverse solution.

S362: If the calculation of the final precoding matrix of the user terminal fails, mark the cooperative BS group of the user terminal, and readjust the cooperative BS group of the user terminal, and recalculate the final precoding matrix of the user terminal according to the cooperative BS group.

In another embodiment, because the precoding of the user terminal based on the common BS group succeeds, the number of the BSs in the private BS group of the user terminal may be reduced, and then recalculation is performed according to step S361. In yet another embodiment, the cooperative BS group of the user terminal may be re-determined, and the recalculation starts from step S350.

Clearly, in another embodiment, step S360 may also be as follows. A second precoding matrix of the user terminal is calculated according to the channel state information matrix of the user terminal, instead of using the first precoding matrix calculated in step S350 (for example, the second precoding matrix of the user terminal may be calculated by obtaining a null space of the channel state information matrix). Then, a final precoding matrix is constructed according to the second precoding matrix and the first precoding matrix, so as to perform interference preprocessing on the information of the user terminal. The effect of step S305 may also be achieved in this way. Because the second precoding matrix is not calculated based on the first precoding matrix, the second precoding matrix is only used to perform elimination preprocessing on the inter-cell interference (that is, inter-BS interference).

In another embodiment, as shown in the dashed box of FIG. 6, the preprocessing method for cooperative communication may further include the following step.

S370: Take statistics on user terminals needed to be precoded again when the current common BS group changes due to the joining of a new user terminal, and perform precoding update processing for the user terminals needed to be precoded again.

In the Bc, a set of user terminals needed to be precoded again when the original common BS group changes due to the joining of a new mobile user terminal is taken statistics on, and is marked as Ur={User$_1$, User$_2$, ..., User$_x$}, in which $0 \leq x$, and User$_x$ is identified as the user terminals needed to be precoded again.

For example, in an embodiment, a common BS group 1 (including base stations a, b, and c) serves a user terminal 1 and a user terminal 2, a common BS group 2 (including base stations d, e, f, and g) serves a user terminal 3 and a user terminal 4, and if a user terminal 5 newly joins, the user terminal 5 determines that the BSs a and c are the cooperative BSs of the user terminal 5 according to the method described in the above embodiments. Therefore, the BSs a and c serve the user terminal 1 and the user terminal 2, and also serve the user terminal 5. In this way, a new common BS group (including the BSs a and c) is generated. Because the BSs a and c are in the common BS group serving the user terminal 1 and the user terminal 2, the user terminal 1 and the user terminal 2 are the user terminals for which the precoding is needed to be updated.

It should be noted that, in an embodiment, the precoding update processing for the User$_x$ in the set Ur in step S370 may include the following steps.

a) Multiply a dimension-adjusted precoding matrix fc1 of the original null space and a channel state information matrix H of a newly joining user terminal (only a common BS part H needs to be multiplied), so as to obtain a matrix, and acquire a null space fc2 of the matrix again.

b) Multiply the null space fc2 of the multiplied matrix and the original first precoding matrix fc of the user terminals needed to be precoded again, so as to obtain a first precoding matrix fc·fc2 of the user terminals needed to be precoded again.

c) Calculate, according to a method similar to step S360, a final precoding matrix of the user terminals for which the precoding is needed to be updated. That is to say, the final precoding matrix of the user terminal is updated according to the precoding matrix fc·fc2 of the updated common BS group and the channel state information matrix of the user terminal.

Similarly, in an embodiment, if the precoding update fails, a failed common BS group is marked, the common BS group is reconstructed, and then the precoding is updated.

It should be noted that, in this embodiment, a cooperative BS group is divided into a common BS group and a private BS group, and the precoding of a user terminal is calculated according to the common BS group and the private BS group, which thereby reduces the calculation complexity. In an embodiment, the precoding of the user terminal may not be calculated according to the common BS group and the private BS group, which may result in an increase of matrix elements designed in the calculation and a high calculation complexity.

In this embodiment of the present invention, through the above technical solution, user terminal-centered resource scheduling is performed, so as to serve a user of the terminal more effectively by taking the requirements and experience of the user and the current network resource condition into account; real-time update is dynamically performed on a cooperative BS group based on a user terminal-centered cooperative BS transmission policy, to dynamically expand the cooperative BS group, and the user terminals needed to be precoded again due to the joining of a new user terminal are precoded again, so as to support multiple user terminals. A precoding matrix of the MS is calculated according to the common BS group and the channel state information of the MS by scheduling time-frequency resources, which may effectively eliminate inter-BS interference inside the cooperative BS group and interference at the cooperative BS group edge, so that the user obtains a great cooperation benefit. The user terminal-centered operation reduce the interference of a transmitted signal to other user terminals. The cooperative BS group is divided into the common BS group and the private BS group, and the precoding of the user terminal is calculated according to the common BS group and the private BS group, which thereby reduces the calculation complexity.

Figure 7:
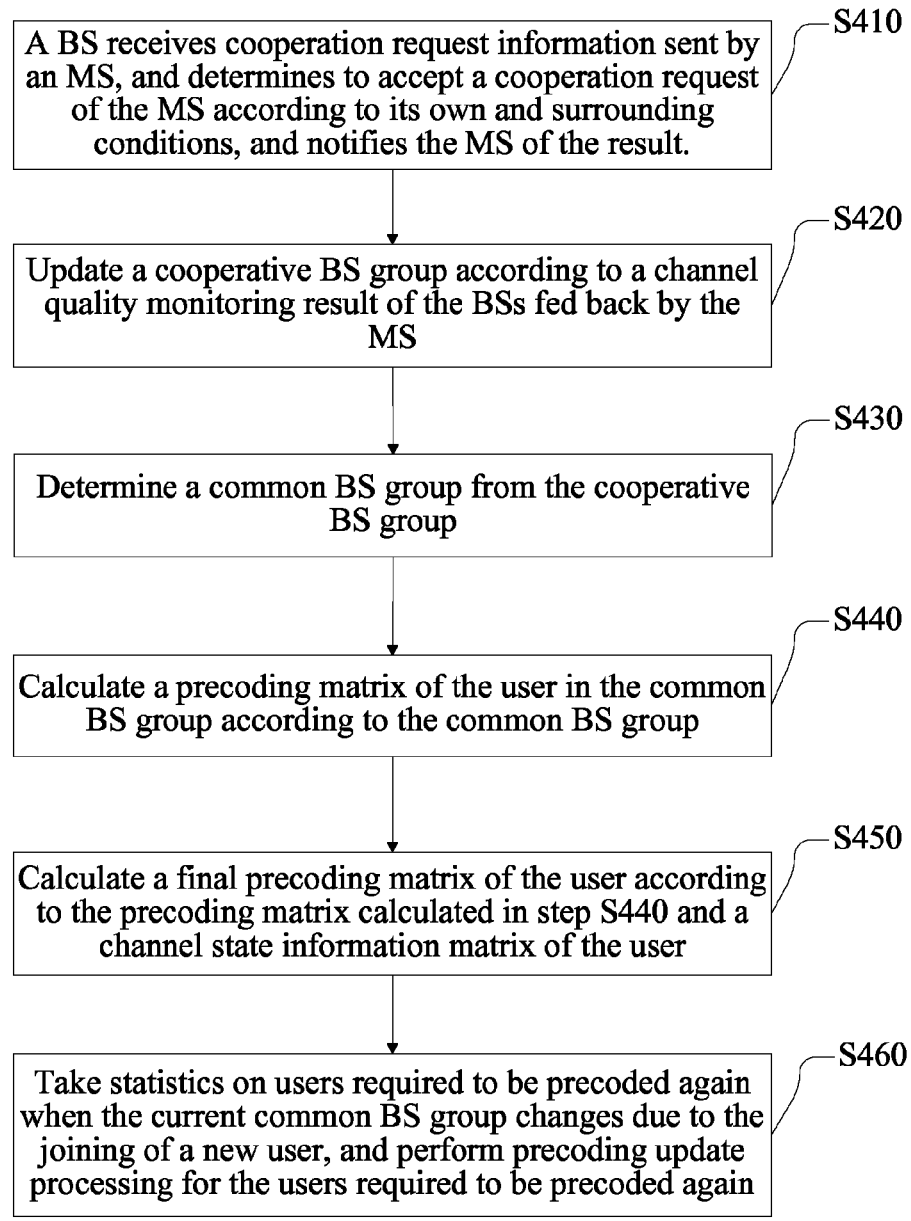
FIG. 7 is a flowchart of a preprocessing method for cooperative communication according to an embodiment of the present invention.

As shown in FIG. 7, an embodiment of the present invention provides a preprocessing method for cooperative communication, and the method is applied to a Co-MIMO system shown in FIG. 1 or other communication systems, such as an MIMO-OFDM system, an LTE system, or a WiMAX system. The difference between the method and the method in the embodiment shown in FIG. 6 lies in a different method of determining a cooperative BS group. Specifically, the method includes the following steps.

S410: A BS receives cooperation request information sent by an MS, and determines to accept a cooperation request of the MS according to its own and surrounding conditions, and notifies the MS of the result.

At the MS side, the MS obtains channel qualities of channels between the MS and each BS in the manner of channel estimation or measurement, the MS may select a number N of channels with the best channel quality from all the channels, and send the cooperation request information to N BSs corresponding to the N channels. Herein, N is a numerical value set according to a bearing capability of the MS. N may be a preset value or a value dynamically set during the process of channel selection.

After receiving the cooperation request information sent by the MS, each BS among the N BSs determines whether to accept the cooperation request of the MS according to its own and surrounding conditions (such as radio resources or cooperation conditions). When its own and surrounding conditions of a certain BS are suitable, the BS accepts the cooperation request of the MS, and acts as a cooperative BS of the MS.

In an instance, if all the N BSs accept the cooperation request of the MS, the N BSs constitute a cooperative BS group, and notify the MS of the result. In another instance, some BSs among the N BSs may reject the cooperation request of the MS because their own or surrounding conditions are unsuitable (for example, their own loads are too large or the surrounding resources are insufficient), and then, the remaining BSs that receive the cooperation request information of the MS may constitute a cooperative BS group, and notify the MS of the result.

S420: According to a channel quality monitoring result of the BS fed back by the MS, update the cooperative BS group.

After the cooperative BS group is determined in the step S410, the MS may continue to monitor the channel quality of each BS. That is to say, in an embodiment, the MS may continue to receive signals sent by each BS, which may include signals of BSs that are not included in the cooperative BS group. The MS determines the channel quality of each BS according to the received signals of the BS, and sends a channel quality monitoring result, in which the channel quality monitoring result includes the quality condition of each channel. In another embodiment, the MS may also obtain the channel quality of each BS that sends signals in other manners.

In an embodiment, a threshold, which is referred to as a first threshold, may also be preset. When the channel quality of a certain BS is lower than the first threshold, it indicates that the channel quality of the BS is very poor. Therefore, in order to ensure the cooperation quality, the MS does not send a cooperation request to the BS. After selecting all the BSs with the channel quality higher than the first threshold, the MS selects N BSs with the best channel quality from the BSs, and sends the cooperation request information to the N BSs.

After receiving the cooperation request information sent by the MS, each BS among the N BSs determines whether to accept the cooperation request of the MS according to its own and surrounding conditions (such as radio resources or cooperation conditions). The BSs accepting the cooperation request of the MS constitute a cooperative BS group of the MS. Therefore, the update of the cooperative BS group is completed.

After the update of the cooperative BS group is completed, the following steps in this embodiment are the same as steps S340 to S370 in the embodiment shown in FIG. 5. Therefore, the steps are described briefly hereinafter, and the details of the steps are not given herein again.

S430: Determine a common BS group in the cooperative BS group.

In this embodiment, after the cooperative BS group is determined and updated, it also needs to determine the common BS group in the cooperative BS group at a BS side. In this embodiment, the common BS group refers to a set of common BSs sharing resources with other user terminals in the cooperative BS group. In contrast to the common BS group, the remaining BSs except for the common BS group in the cooperative BS group constitute a private BS group. That is to say, the private BS group refers to a set of BSs cooperating with only one user terminal in the cooperative BS group. After the common BS group is determined, the remaining BSs in the cooperative BS group constitute the private BS group. In this embodiment, the common BS group is marked as Bc={BS1, BS2, . . . , BSn}, in which n is an integer satisfying the condition of $0 \leq n \leq N$.

S440: Calculate a first precoding matrix of the user terminal according to the common BS group. The first precoding matrix is used to perform elimination preprocessing on interference from the user terminal to other user terminals served by the common BS group.

Specifically, in an instance, step S440 may include the following steps.

S441: Calculate a null space of a channel matrix corresponding to other user terminals in the common BS group Bc, and calculate the first precoding matrix fc of the user terminal according to the null space.

S442: If the precoding fails, mark a failed common BS group, and readjust the common BS group so as to avoid a common BS group the same as the common BS group that is marked failure, and recalculate the precoding matrix of the user terminal according to the rescheduled common BS group.

In an embodiment, whether the precoding fails may be determined according to a result whether a null space of the interference channel matrix of other user terminals is found in step S441, and the precoding fails if the null space is not found.

S450: Calculate a cooperative BS group precoding, that is, a final precoding matrix of the user terminal, according to the first precoding matrix calculated in step S440 and a channel state information matrix of the user terminal.

Specifically, in an embodiment, step S450 may include the following steps.

S451: Obtain a new matrix based on a product of a channel state information matrix $H_1$ of this user terminal and the first precoding matrix fc, and obtain a null space of the matrix, and calculate a final precoding matrix of the user terminal according to the null space.

S452: Mark the cooperative BS group of the user terminal if the calculation of the final precoding matrix of the user terminal fails, and readjust the cooperative BS group of the user terminal, and recalculate the final precoding matrix of the user terminal according to the cooperative BS group.

Specifically, in an instance, if the precoding fails in step S451, the cooperative BS group of the user terminal is marked. At this time, because the precoding of the user terminal based on the common BS group succeeds, the number of the BSs in a private BS group of the user terminal may be reduced, and then recalculation is performed according to step S451. In another instance, the cooperative BS group of the user terminal may also be readjusted, that is, the cooperative BS group of the user terminal may be re-determined, and the recalculation starts from step S440. In an embodiment, whether the precoding fails may be determined according to a result whether the null space of the interference channel matrix of other user terminals is found in step S351, and the precoding fails if the null space is not found.

In another embodiment, as shown in the dashed box of FIG. 7, the preprocessing method for cooperative communication may further include the following step.

S460: Take statistics on user terminals needed to be precoded again when the current common BS group changes due to the joining of a new user terminal, and perform precoding update processing for the user terminals needed to be precoded again.

The specific method has been described in detail in the embodiment corresponding to FIG. 6, and is not described in detail herein again.

It should be noted that, in this embodiment, a cooperative BS group is divided into a common BS group and a private BS group, and the precoding of a user terminal is calculated according to the common BS group and the private BS group, which thereby reduces the calculation complexity. In an instance, the precoding of the user terminal may not be calculated according to the common BS group and the private BS group, which may result in an increase of matrix elements designed in the calculation and a high calculation complexity.

In this embodiment of the present invention, through the above technical solution, user-centered resource scheduling is performed, so as to serve a user more effectively by taking the requirements and experience of the user and the current network resource condition into account; real-time update is dynamically performed on a cooperative BS group based on a user-centered cooperative BS transmission policy, to dynamically expand the cooperative BS group, and the user terminals needed to be precoded again due to the joining of a new user terminal are precoded again, so as to support multiple user terminals. The BS precoding of the MS is calculated according to the common BS group and the channel state information of the MS by scheduling the time-frequency resources, which may effectively eliminate inter-BS interference inside the cooperative BS group and interference at the cooperative BS group edge, so that the user obtains a large cooperation benefit. The user-centered operation reduces the interference of a transmitted signal to other users. The cooperative BS group is divided into the common BS group and the private BS group, and the precoding of the user is calculated according to the common BS group and the private BS group, which thereby reduces the calculation complexity.

Specifically, in order to make the embodiment of the present invention more comprehensible, based on the descriptions of the above embodiments, this embodiment of the present invention is described in a specifically assumed scenario according to the method provided in the above embodiments. The assumed scenario of this embodiment includes four user terminals, and is in an environment of multiple BSs, in which N=7, that is, each user terminal may select seven BSs to provide services.

It should be noted that, the four user terminals in the assumed scenario of this embodiment respectively are User1, User2, User3, and User4, in which User1 is a newly joining user terminal, that is, the three users of User2, User3, and User4 originally exist. User 1-centered precoding is performed hereinafter. The cooperative BS group of User 1 is confirmed as [BS2, BS3, BS4, BS5, BS6, BS7, BS8] according to the method provided in the above embodiments.

$$Y = \begin{bmatrix} h_{11} & h_{12} & h_{13} & h_{14} & h_{15} & h_{16} & \emptyset & h_{18} & \emptyset & \emptyset \\ \emptyset & h_{22} & h_{23} & h_{24} & h_{25} & h_{26} & \emptyset & \emptyset & h_{29} & h_{210} \\ \emptyset & h_{32} & h_{33} & h_{34} & h_{35} & \emptyset & h_{37} & h_{38} & h_{39} & \emptyset \\ \emptyset & h_{42} & h_{43} & h_{44} & h_{45} & \emptyset & h_{47} & h_{48} & h_{49} & \emptyset \end{bmatrix} \quad (1)$$

$$\begin{bmatrix} f_{11} & 0 & 0 & 0 \\ f_{12} & f_{22} & f_{32} & f_{42} \\ f_{13} & f_{23} & f_{33} & f_{43} \\ f_{14} & f_{24} & f_{35} & f_{44} \\ f_{15} & f_{25} & f_{34} & f_{44} \\ f_{16} & f_{26} & 0 & 0 \\ 0 & 0 & f_{37} & f_{47} \\ f_{18} & 0 & f_{38} & f_{48} \\ 0 & f_{29} & f_{39} & f_{49} \\ 0 & f_{210} & 0 & 0 \end{bmatrix} \cdot x + n$$

a) It may be known from Formula (1) that, channel state information of User 1 and its corresponding cooperative BS group is:

$$H_1=[h_{11},h_{12},h_{13},h_{14},h_{15},h_{16},h_{18}] \quad (2).$$

b) It is assumed that, by applying the method described in the above embodiments, a set of the common BS group is determined as:

$$Bc=[BS2,BS3,BS4,BS5,BS6,BS8] \quad (3);$$

and a set of the user terminals for which the precoding is needed to be updated is:

$$Ur=[User2,User3,User4] \quad (4).$$

c) Determine a null space corresponding to User1. A channel state information matrix of associated user terminals corresponding to the BSs in the Bc is found, and a corresponding null space $Z_1$ is calculated. In this embodiment, the channel state information $Hs_1=[h_{12}, h_{13}, h_{14}, h_{15}, h_{16}, h_{18}]$ corresponding to User1 may be removed, and SVD is performed on the remaining part of the matrix, that is, an interference channel matrix $$\begin{bmatrix} h_{22} & h_{23} & h_{24} & h_{25} & h_{26} & 0 \\ h_{32} & h_{33} & h_{34} & h_{35} & 0 & h_{38} \\ h_{42} & h_{43} & h_{44} & h_{45} & 0 & h_{48} \end{bmatrix} \quad (5)$$

of other user terminals in the common BS group Bc, so as to obtain a null space of (5). Clearly, in another embodiment, the null space may also be obtained through Householder pseudo upper-triangular decomposition, or Gram-Schmidt orthogonalization, or a generalized inverse solution.

d) Update precoding of the related User2, User3, and User4.

1. It is assumed that the channel state information corresponding to User2 is $H_2=[h_{22}, h_{23}, h_{24}, h_{25}, h_{26}, h_{29}, h_{210}]$, a corresponding precoding matrix is $Z'_2$, in which $Z'_2$ is a precoding matrix of 7×m, and a null space of a corresponding common BS group is:

$$Z_{p2} = \begin{bmatrix} z_{22}^{(1)} & \cdots & z_{22}^{(m)} \\ z_{23}^{(1)} & \cdots & z_{23}^{(m)} \\ z_{24}^{(1)} & \cdots & z_{24}^{(m)} \\ z_{25}^{(1)} & \cdots & z_{25}^{(m)} \\ z_{29}^{(1)} & \cdots & z_{29}^{(m)} \end{bmatrix}, \text{ in which } 1 \le m \le N-1. \quad (6)$$

If m=0, no null space exists, and a failure is marked.

The precoding is: $F_2=[f_{22} \; f_{23} \; f_{24} \; f_{25} \; f_{26} \; 0 \; 0 \; f_{29} \; f_{210}]$.

A channel state matrix of the newly-added User1 is: $H_1=[h_{11}, h_{12}, h_{13}, h_{14}, h_{15}, h_{16}, h_{18}]$.

2. $Z_{p2}$ is converted into a matrix corresponding to channel state information $H_1'=[h_{12} \; h_{13} \; h_{14} \; h_{15} \; h_{16}]$ of User1 corresponding to a common BS group of User1 and User2:

$$Z'_{p2} = \begin{bmatrix} z_{22}^{(1)} & \cdots & z_{22}^{(m)} \\ z_{23}^{(1)} & \cdots & z_{23}^{(m)} \\ z_{24}^{(1)} & \cdots & z_{24}^{(m)} \\ z_{25}^{(1)} & \cdots & z_{25}^{(m)} \\ 0 & \cdots 1 \cdots & 0 \end{bmatrix}. \quad (7)$$

Let $H_2'=H_1' \cdot Z'_{p2}$, a null space $Z''_2$ of $H'_2$ is determined. $Z''_2$ is a matrix of a dimension of m×k, in which $1 \le k \le (m-1)$. If k=1, no corresponding null space exists, and a failure is marked.

It should be noted herein that, according to Formula (1), as for User2, before User1 joins, the common BS group in the cooperative BS group is: [BS2, BS3, BS4, BS5], and after User1 joins, the common BS group is [BS2, BS3, BS4, BS5, BS6], that is, after User1 joins, an additional BS6 exists in the common BS group. Therefore, it is necessary to add 0 or 1 to the last line of $Z'_{p2}$, which is shown in (7).

3. The precoding matrix of the null space is updated as $Z_2=Z'_2 \cdot Z''_2$, $H_2 \cdot Z_2$ is precoded, and inter-BS interference is eliminated, so as to obtain a new precoding matrix corresponding to User2:

$$F_2=[0 \; f_{22} \; f_{23} \; f_{24} \; f_{25} \; f_{26} \; 0 \; 0 \; f_{29} \; f_{210}] \quad (8).$$

The steps of updating the precoding for User3 and User4 are similar to those for User2, and are not described in detail herein again.

e) Precode $H_1 \cdot Z_1$ (the specific manner is not limited), and eliminate the inter-BS interference, so as to obtain a precoding matrix corresponding to User1:

$$F_1=[f_{11} \; f_{12} \; f_{13} \; f_{14} \; f_{14} \; f_{16} \; 0 \; f_{18} \; 0 \; 0] \quad (9).$$

f) Mark the failure and feed the failure back to a scheduler if steps c and d fail, so as to reduce the number of user terminal cooperative cells or to perform rescheduling.

In this embodiment of the present invention, through the above technical solution, user terminal-centered resource scheduling is performed, so as to serve a user of the terminal more effectively by taking the requirements and experience of the user and the current network resource condition into account; real-time update is dynamically performed on a cooperative BS group based on a user-centered cooperative BS transmission policy, to dynamically expand the cooperative BS group, and the user terminals needed to be precoded again due to the joining of a new user terminal are precoded again, so as to support multiple user terminals. The BS precoding of the MS is calculated according to the cooperative BS group and the channel state information of the MS by scheduling the time-frequency resources, which may effectively eliminate inter-BS interference inside the cooperative BS group and interference at the cooperative BS group edge, so that the user obtains a great cooperation benefit. The time-frequency resources of multiple user terminals are scheduled by using cooperative BS channel qualities and channel state information, thereby minimizing precoding power consumption and maximizing a multi-user benefit. The user terminal-centered operation reduces the interference of a transmitted signal to other users. The cooperative BS group is divided into the common BS group and the private BS group, and the precoding of the user terminal is calculated according to the common BS group and the private BS group, which thereby reduces the calculation complexity.

Figure 8:
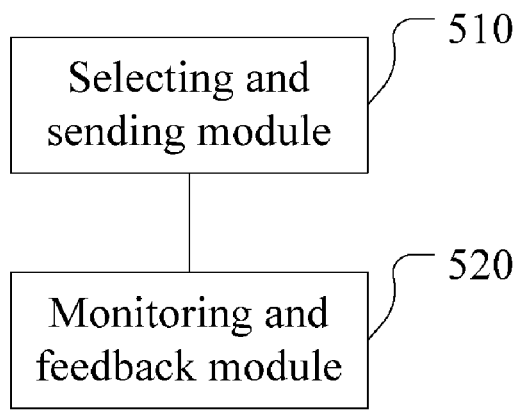
FIG. 8 is a block diagram of a terminal according to an embodiment of the present invention.

As shown in FIG. 8, an embodiment of the present invention provides a terminal device, which includes a selecting and sending module 510 and a monitoring and feedback module 520.

The selecting and sending module 510 is configured to select a BS according to a channel quality, and send cooperation request information to the selected BS, in which the cooperation request information is used to determine a cooperative BS group.

In this embodiment, "each channel" refers to a channel between the terminal device and each of a plurality of BSs. In an embodiment, differences of the channel quality may be reflected in differences of such information as a path loss, an SNR or an SINR obtained through channel measurement and estimation or received at the terminal device side.

The monitoring and feedback module 520 is configured to monitor the channel quality of each BS, and send a channel quality monitoring result, in which the channel quality monitoring result is used to enable the BS side to update the cooperative BS group.

After the cooperative BS group is determined, the monitoring and feedback module 520 may continue to monitor the channel quality of each BS according to wireless signals that may be received by the terminal device, and send the channel quality monitoring result, in which the channel quality monitoring result includes the quality condition of each channel. The BS side updates a previous cooperative BS group according to the channel quality monitoring result, to ensure that the channel qualities of the BSs in the cooperative BS group are relatively good. For example, the quality of a channel between a BS cooperating with the terminal device in a previous cycle and the terminal device may be deteriorated in a next cycle because of a position change of the terminal device, and then the terminal device will not request the BS to cooperate with it.

After the cooperative BS group is updated, the BS side may schedule time-frequency resources, and calculate BS precoding of the terminal device according to the cooperative BS group and channel state information of the terminal device, in which the BS precoding is used to perform interference pre-processing on the terminal device.

In this embodiment of the present invention, through the above technical solution, user terminal-centered resource scheduling is performed, so as to serve a user of the terminal more effectively by taking the requirements and experience of the user and the current network resource condition into account; and user terminal-centered real-time update is dynamically performed on a cooperative BS group, to dynamically expand the cooperative BS group. In addition, the BS precoding of the MS is calculated according to the cooperative BS group and the channel state information of the MS, so that the user obtains a great cooperation benefit.

Figure 9:
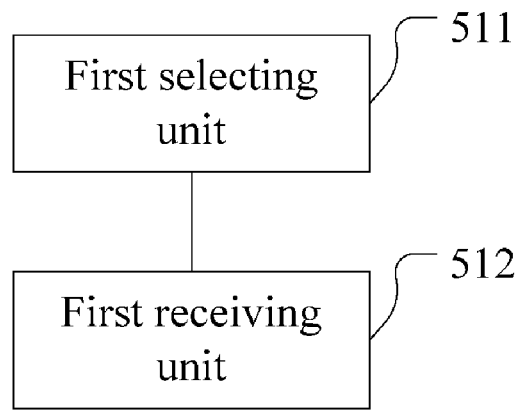
FIG. 9 is a block diagram of a selecting and sending module of a terminal according to an embodiment of the present invention.

As shown in FIG. 9, in an embodiment, the selecting and sending module 510 of the terminal device provided in the embodiment corresponding to FIG. 8 may include a first selecting unit 511 and a first receiving unit 512.

The first selecting unit 511 is configured to select a channel with the best channel quality, and send cooperation request information to a BS corresponding to the channel, in which the cooperation request information is used to enable the BS corresponding to the channel to confirm a cooperative BS group.

The first selecting unit 511 selects a channel with the best channel quality from the monitored BS channels, and sends the cooperation request information to the BS corresponding to the channel.

In the following, the BS corresponding to the channel with the best channel quality is referred to as a BS A for the convenience of description.

In this embodiment, the cooperation request information is used to enable the BS A to confirm the cooperative BS group. After receiving the cooperation request information sent by the first selecting unit 511, the BS A determines whether to accept a cooperation request of an MS according to its own and surrounding conditions (such as radio resources or cooperation conditions). When its own and surrounding conditions are suitable, the BS A accepts the cooperation request of the MS, selects N BSs that are closest to the BS A itself as a cooperative BS group, and notifies the MS of the result.

The first receiving unit 512 is configured to receive a cooperative BS group result fed back by a BS side, in which the cooperative BS group result is used to inform the cooperative BS group that cooperates with the MS.

After acquiring the cooperative BS group of the MS through the first receiving unit 512, in this embodiment, the monitoring and feedback module 520 may monitor the channel quality of each BS, and send a channel quality monitoring result, in which the channel quality monitoring result is used to enable the BS side to update the cooperative BS group.

Specifically, the monitoring and feedback module 520 monitors the channel quality of each BS corresponding to wireless signals that may be received, and feeds back a result to the BS A, in which the result is used to enable the BS A to update the cooperative BS group.

After receiving the channel quality result of each BS in the cooperative BS group fed back by the monitoring and feedback module 520, the BS A may update the cooperative BS group according to the channel quality condition of each BS.

Specifically, in an instance, two thresholds that respectively are a first threshold and a second threshold may be set. When the channel quality of a certain BS is lower than the first threshold, it indicates that the channel quality of the BS is very poor. Therefore, in order to ensure the cooperation quality, the BS A removes the BS from the cooperative BS group.

The second threshold is set to avoid a large difference between qualities of the channel of the BS with the best channel quality and the channel of the BS with the worst channel quality in a cooperative BS group, so as to ensure a cooperation quality. For the convenience of description, a channel quality information value of the channel with the worst channel quality is referred to as a, and a channel quality information value of the channel with the best channel quality is referred to as b. In an embodiment, a ratio of a logarithmic value of a to a logarithmic value of b may be compared with the second threshold, and if the ratio is smaller than the second threshold, a BS corresponding to a is removed from the cooperative BS group. In another embodiment, a difference between a and b may also be compared with the second threshold, and if the difference is smaller than the second threshold, the BS corresponding to a is removed from the cooperative BS group. In another embodiment, a ratio of a to b may also be compared with the second threshold, and if the ratio is smaller than the second threshold, the BS corresponding to a is removed from the cooperative BS group. Clearly, other comparison manners may also be adopted, which are not specifically limited in this embodiment of the present invention.

After the cooperative BS group is updated, the BS side calculates BS precoding of the MS according to the cooperative BS group of the MS, in which the BS precoding is used to perform interference preprocessing on the MS.

In this embodiment of the present invention, through the above technical solution, user terminal-centered resource scheduling is performed, so as to serve a user of the terminal more effectively by taking the requirements and experience of a user and the current network resource condition into account; and a cooperative BS group is dynamically updated based on a user terminal-centered cooperative BS transmission policy, to dynamically expand the cooperative BS group. In addition, the BS precoding of the MS is calculated according to the cooperative BS group of the MS, which may effectively eliminate inter-BS interference inside the cooperative BS group and interference at the cooperative BS group edge, so that the user obtains a great cooperation benefit.

Figure 10:
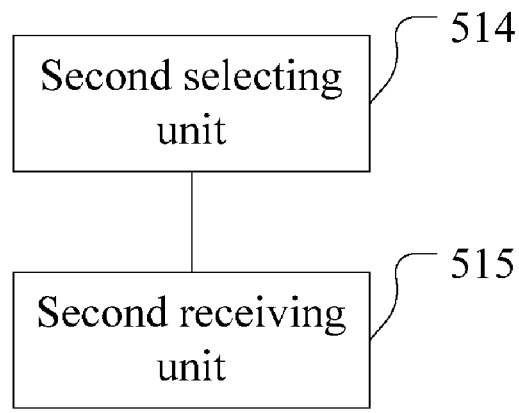
FIG. 10 is a block diagram of a selecting and sending module of a terminal according to an embodiment of the present invention.

As shown in FIG. 10, in another embodiment, the selecting and sending module 510 of the terminal device provided in the embodiment corresponding to FIG. 8 may include a second selecting unit 514 and a second receiving unit 515.

The second selecting unit 514 is configured to select a number N of channels with the best channel quality, and sends cooperation request information to BSs corresponding to the N channels, in which the cooperation request information is used to request the N BSs to act as a cooperative BS group of the MS, that is, the cooperation request information is used to enable the N BSs to confirm a cooperative BS group.

The second selecting unit 514 selects N channels with the best channel quality from the channels of the BSs, and sends the cooperation request information to the N BSs corresponding to the N channels. N may be a preset value or a value dynamically set during the process of channel selection.

After receiving the cooperation request information sent by the MS, each BS among the N BSs determines whether to accept a cooperation request of the MS according to its own and surrounding conditions (such as radio resources or cooperation conditions). When its own and surrounding conditions of a certain BS are suitable, the BS accepts the cooperation request of the MS, acts as a cooperative BS of the MS, and feeds back a result to the MS. All the BSs accepting the cooperation request of the MS constitute a cooperative BS group of the MS.

The second receiving unit 515 is configured to receive a cooperative BS group result fed back by the BS side, in which the cooperative BS group result is used to inform the cooperative BS group that cooperates with the MS.

After acquiring the cooperative BS group of the MS through the second receiving unit 515, in this embodiment, the monitoring and feedback module 520 may monitor the channel quality of each BS, and send a channel quality monitoring result, in which the channel quality monitoring result is used to enable the BS side to update the cooperative BS group.

The specific update method has been described in detail in the method embodiment corresponding to FIG. 4, and is not described in detail herein again.

After the cooperative BS group is updated, the BS side may schedule time-frequency resources, and calculate BS precoding of the MS according to the cooperative BS group and channel state information of the MS, in which the BS precoding is used to perform interference preprocessing on the MS.

In this embodiment of the present invention, through the above technical solution, user terminal-centered resource scheduling is performed, so as to serve a user of the terminal more effectively by taking the requirements and experience of the user and the current network resource condition into account; and a cooperative BS group may be dynamically expanded by using a user terminal-centered cooperative BS transmission policy, so as to support multiple user terminals. The BS precoding of the MS is calculated according to the cooperative BS group and the channel state information of the MS, which may effectively eliminate inter-BS interference inside the cooperative BS group and interference at the cooperative BS group edge, so that the user obtains a great cooperation benefit.

Figure 11:
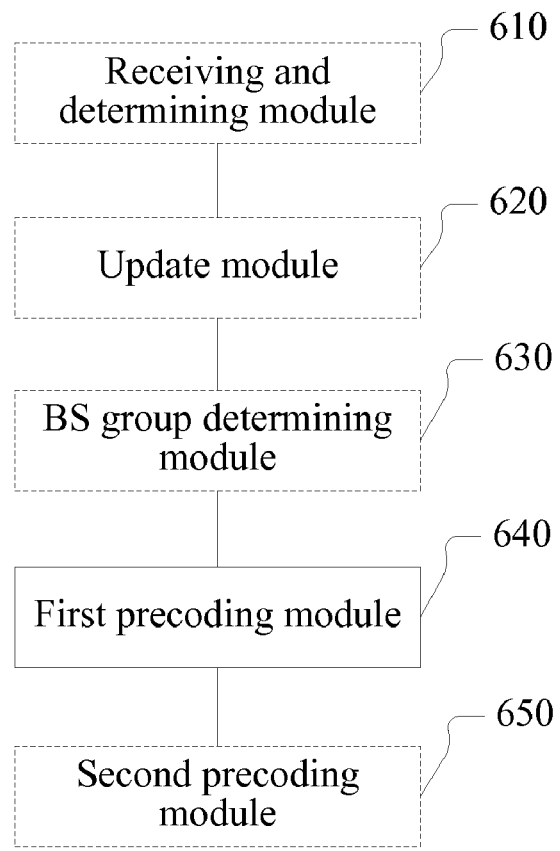
FIG. 11 is a block diagram of a base station according to an embodiment of the present invention.

As shown in FIG. 11, an embodiment of the present invention provides a BS, which includes a BS group determining module 630 and a first precoding module 640.

The BS group determining module 630 is configured to obtain a common BS group from a cooperative BS group of a user terminal, in which the common BS group includes a set of BSs providing a cooperative service for other user terminals in the cooperative BS group.

In this embodiment, after the cooperative BS group is determined and updated, the BS group determining module 630 also needs to determine a common BS group and a private BS group from the cooperative BS group at a BS side. In this embodiment, the common BS group refers to a set of common BSs sharing the resources for other user terminals in the cooperative BS group. The private BS group refers to a set of BSs cooperating with only one user terminal in the cooperative BS group. Actually, after the common BS group is determined, the remaining BSs in the cooperative BS group constitute the private BS group. In this embodiment, the common BS group is marked as Bc={BS1, BS2, . . . , BSn}, in which n is an integer satisfying the condition of $0 \leq n \leq N$.

The first precoding module 640 is configured to calculate a precoding matrix of the user terminal in the common BS group according to the common BS group, in which the first precoding matrix is used to perform elimination preprocessing on interference from the user terminal to other user terminals served by the common BS group.

In this embodiment of the present invention, through the above technical solution, the common BS group is confirmed in the cooperative BS group of the user terminal, and a final first precoding matrix of the user terminal is calculated in the common BS group, so that elimination preprocessing is performed for the interference from the user terminal to other user terminals served by the common BS group, which thereby reduces the MUI.

As shown in the dashed box of FIG. 11, in another embodiment, the BS may further include a receiving and determining module 610, an update module 620, and a second precoding module 650.

The receiving and determining module 610 is configured to receive cooperation request information of the MS, and determine the cooperative BS group of the MS according to the cooperation request information.

The update module 620 is configured to update the cooperative BS group determined by the receiving and determining module 610 according to a channel quality monitoring result sent by the MS.

The second precoding module 650 is configured to calculate a final precoding matrix of the user terminal according to the precoding matrix calculated by the first precoding module 640 and the channel state information matrix of the user terminal, in which the final precoding matrix is used to perform interference preprocessing on information of the user terminal.

In this embodiment of the present invention, through the above technical solution, user terminal-centered resource scheduling is performed, so as to serve a user of the terminal more effectively by taking the requirements and experience of the user and the current network resource condition into account; and real-time update is dynamically performed on a cooperative BS group based on a user terminal-centered cooperative BS transmission policy, to dynamically expand the cooperative BS group. The common BS group is confirmed in the cooperative BS group of the user terminal, and the final precoding matrix of the user terminal is calculated according to the precoding matrix of the user terminal in the common BS group, which thereby reduces the calculation complexity. Moreover, the interference preprocessing is performed on the information of the user terminal by precoding the user terminal, which thereby reduces the MUI and the inter-cell interference.

Figure 17:
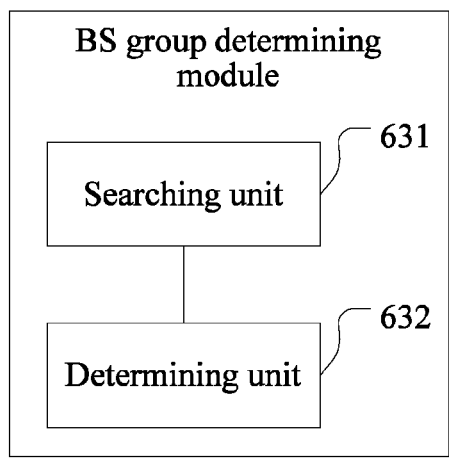
FIG. 17 is a block diagram of an obtaining module of a base station according to an embodiment of the present invention.

As shown in FIG. 17, in an embodiment, the BS group determining module 630 of the BS provided in the embodiment corresponding to FIG. 11 may include a searching unit 631 and a determining unit 632.

The searching unit 631 is configured to find a set of BSs providing a cooperative service for other user terminals from a cooperative BS group of the user terminal.

The determining unit 632 is configured to determine the set of BSs providing the cooperative service for the other user terminals as a common BS group of the user terminal.

Figure 12:
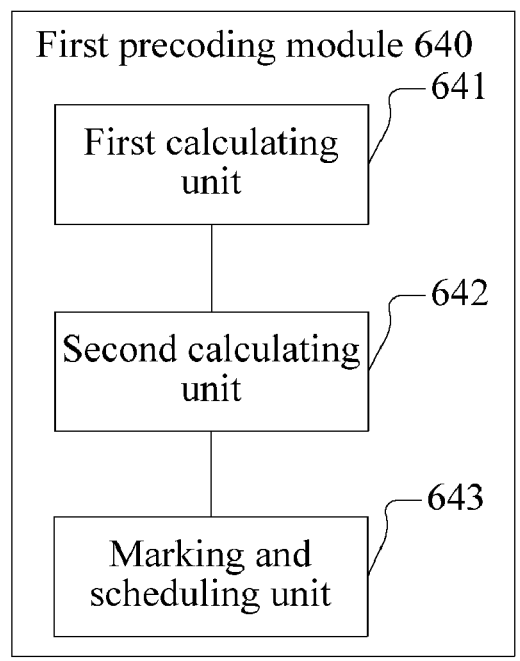
FIG. 12 is a block diagram of a first precoding module of a base station according to an embodiment of the present invention.

As shown in FIG. 12, in an embodiment, the first precoding module 640 of the BS provided in the embodiment corresponding to FIG. 11 may include a first calculating unit 641 and a second calculating unit 642.

The first calculating unit 641 is configured to calculate a null space of a channel matrix corresponding to other user terminals in the common BS group.

The second calculating unit 642 is configured to calculate a first precoding matrix of the user terminal according to the null space calculated by the first calculating unit 641.

Clearly, in an instance, the first precoding module 640 may further include a marking and scheduling unit 643.

The marking and scheduling unit 643 is configured to mark a failed common BS group when the precoding fails, reschedule the common BS group so as to avoid a common BS group the same as the common BS group that is marked failure, and recalculate the precoding matrix of the user terminal according to the rescheduled common BS group.

In this embodiment of the present invention, through the above technical solution, user terminal-centered resource scheduling is performed, so as to serve a user of the terminal more effectively by taking the requirements and experience of the user and the current network resource condition into account; and real-time update is dynamically performed on a cooperative BS group based on a user terminal-centered cooperative BS transmission policy, to dynamically expand the cooperative BS group. The common BS group is confirmed in the cooperative BS group of the user terminal, the first precoding matrix of the user terminal is calculated according to the common BS group, and the final precoding matrix of the user terminal is calculated accordingly, which thereby reduces the calculation complexity. Moreover, the interference preprocessing is performed on the information of the user terminal by precoding the user terminal, which thereby reduces the MUI and the inter-cell interference.

Figure 13:
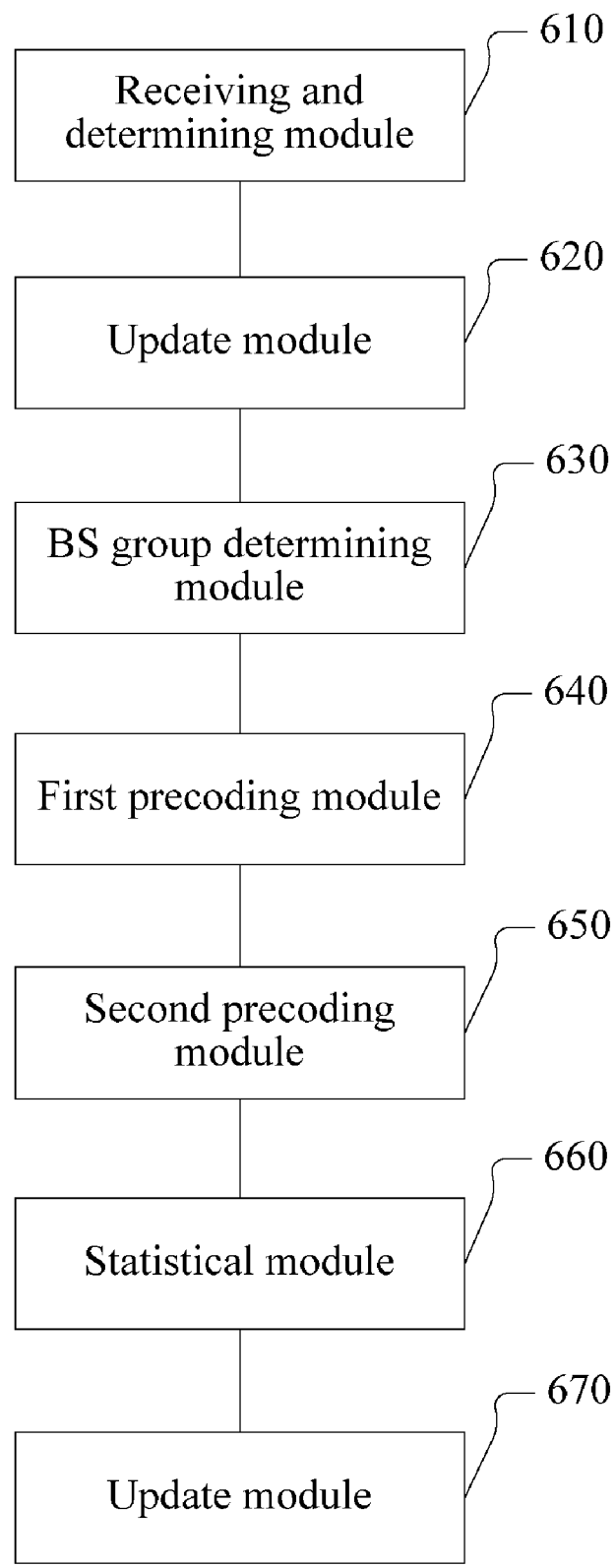
FIG. 13 is a block diagram of a base station according to an embodiment of the present invention.

As shown in FIG. 13, in another embodiment, the BS may further include a statistical module 660 and an update module 670.

The statistical module 660 is configured to take statistics on user terminals that need to be precoded again when a current common BS group changes due to the joining of a new user terminal.

In the Bc, the statistical module 660 takes statistics on a set of user terminals that need to be precoded again when the cooperative BS group changes due to the joining of a new mobile user terminal, and the set of user terminals is marked as $Ur=\{User_1, User_2, \ldots, User_x\}$, in which $0 \leq x$, and $User_x$ is identified as the user terminals needed to be precoded again.

The update module 670 is configured to perform precoding update processing for the user terminals needed to be precoded again.

In this embodiment of the present invention, through the above technical solution, user terminal-centered resource scheduling is performed, so as to serve a user of the terminal more effectively by taking the requirements and experience of the user and the current network resource condition into account; real-time update is dynamically performed on a cooperative BS group based on a user terminal-centered cooperative BS transmission policy, to dynamically expand the cooperative BS group, and the user terminals needed to be precoded again due to the joining of a new user terminal are precoded again, so as to support multiple user terminals. Time-frequency resources are scheduled, and the cooperative BS group is divided into the common BS group and the private BS group, and the final precoding matrix of the user terminal is calculated according to the common BS group, which thereby reduces the calculation complexity. Moreover, the interference preprocessing is performed on the information of the user terminal by precoding, which thereby reduces the MUI and the inter-cell interference.

Figure 14:
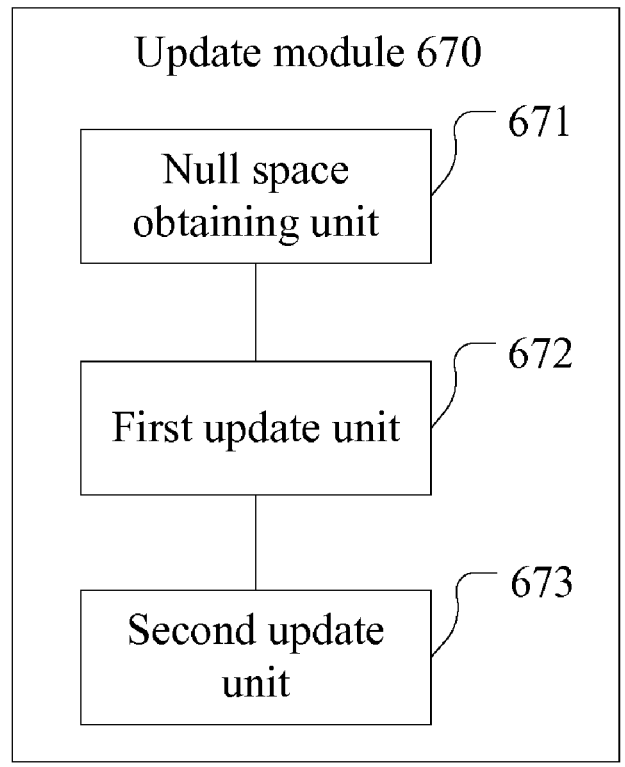
FIG. 14 is a block diagram of an update module of a base station according to an embodiment of the present invention.

Specifically, as shown in FIG. 14, in an embodiment, the update module 670 may include a null space obtaining unit 671, a first update unit 672, and a second update unit 673.

The null space obtaining unit 671 is configured to multiply a dimension-adjusted precoding matrix of an original null space of the user terminals needed to be precoded again by a channel state information matrix of a common BS part of a newly joining user terminal, so as to obtain a null space of a multiplied matrix.

That is to say, the dimension of the precoding matrix of the original null space is adjusted to obtain fc1, and the fc1 is multiplied by the channel state information matrix H of the newly joining user terminal (it only needs to be multiplied by the common BS part H), so as to obtain a matrix, and a null space fc2 of the matrix is acquired again.

The first update unit 672 is configured to multiply the null space of the multiplied matrix by the original first precoding matrix fc of the user terminals needed to be precoded again, so as to obtain a new first precoding matrix of the user terminals needed to be precoded again.

That is to say, through the multiplication, the new first precoding matrix fc·fc2 is obtained.

The second update unit 673 is configured to update a final precoding matrix of the user terminals needed to be precoded again according to the new first precoding matrix and a channel state information matrix of the user terminals needed to be precoded again.

That is to say, the final precoding matrix of the user terminal is updated according to the precoding matrix fc·fc2 of the updated common BS group and the channel state information matrix of the user terminal.

In this embodiment of the present invention, through the above technical solution, user terminal-centered resource scheduling is performed, so as to serve a user of the terminal more effectively by taking the requirements and experience of the user and the current network resource condition into account; real-time update is dynamically performed on a cooperative BS group based on a user terminal-centered cooperative BS transmission policy, to dynamically expand the cooperative BS group, and the user terminals needed to be precoded again due to the joining of a new user terminal are precoded again, so as to support multiple user terminals. Time-frequency resources are scheduled, and the cooperative BS group is divided into the common BS group and the private BS group, and the precoding of the user terminal is calculated according to the common BS group, which thereby reduces the calculation complexity. Moreover, the interference preprocessing is performed on the information of the user terminal by precoding, which thereby reduces the MUI and the inter-cell interference.

Figure 15:
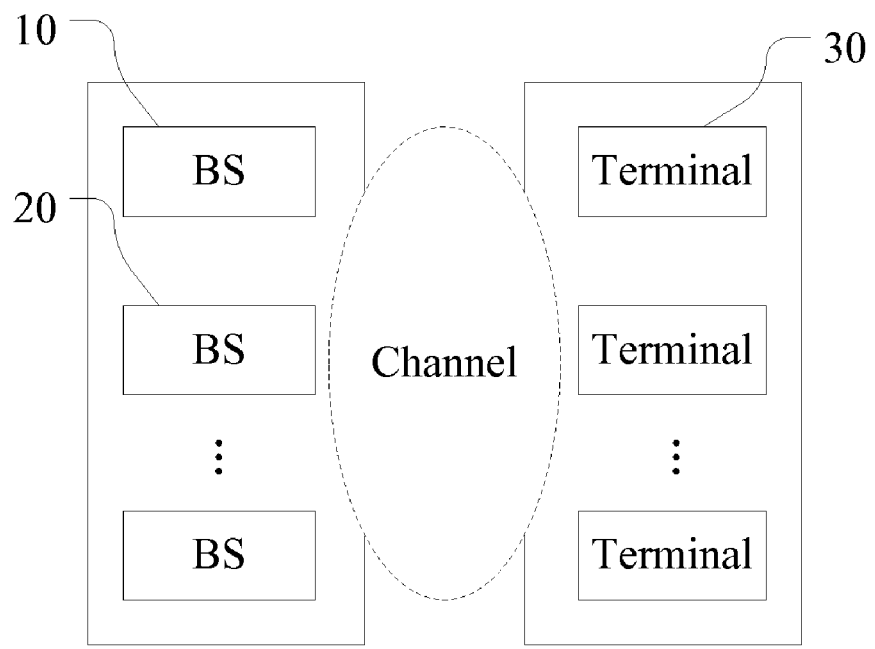
FIG. 15 is a block diagram of a preprocessing system for cooperative communication according to an embodiment of the present invention.

As shown in FIG. 15, an embodiment of the present invention provides a preprocessing system for cooperative communication, which includes at least two BSs 10 and 20 and at least one terminal 30.

The terminal 30 is configured to select a BS according to a channel quality, and send cooperation request information to the selected BS, in which the cooperation request information is used to determine a cooperative BS group; and monitor the channel quality of each BS, and send a channel quality monitoring result, in which the channel quality monitoring result is used to enable a BS side to update a cooperative BS group.

The BS 10 or the BS 20 is configured to receive the cooperation request information of the terminal 30, and determine the cooperative BS group of the terminal 30 according to the cooperation request information; update the cooperative BS group according to the channel quality monitoring result sent by the terminal 30; determine the common BS group from the updated cooperative BS group; calculate a first precoding matrix of the terminal 30 according to the common BS group; and calculate a final precoding matrix of the terminal 30 according to the first precoding matrix and the channel state information matrix of the terminal 30, in which the final precoding matrix is used to perform interference preprocessing on information of the terminal.

In an embodiment, the specific structure and function of the terminal 30 may be the same as those of the embodiment shown in FIG. 8; in another embodiment, may be the same as those of the embodiments shown in FIG. 8 and FIG. 9; and in still another embodiment, may be the same as those of the embodiments shown in FIG. 8 and FIG. 10.

In an embodiment, the specific structure and functions of the BSs 10 and 20 may be the same as those of the embodiment shown in FIG. 11; in an embodiment, may be the same as those of the embodiments shown in FIG. 11 and FIG. 12; in another embodiment, may be the same as those of the embodiments shown in FIG. 11, FIG. 12, and FIG. 13; in another embodiment, may be the same as those of the embodiments shown in FIG. 11 and FIG. 14, or as those of the embodiments shown in FIG. 11, FIG. 12, and FIG. 14; and in still another embodiment, may be the same as those of the embodiments shown in FIG. 11, FIG. 12, FIG. 13, and FIG. 14.

Figure 18:
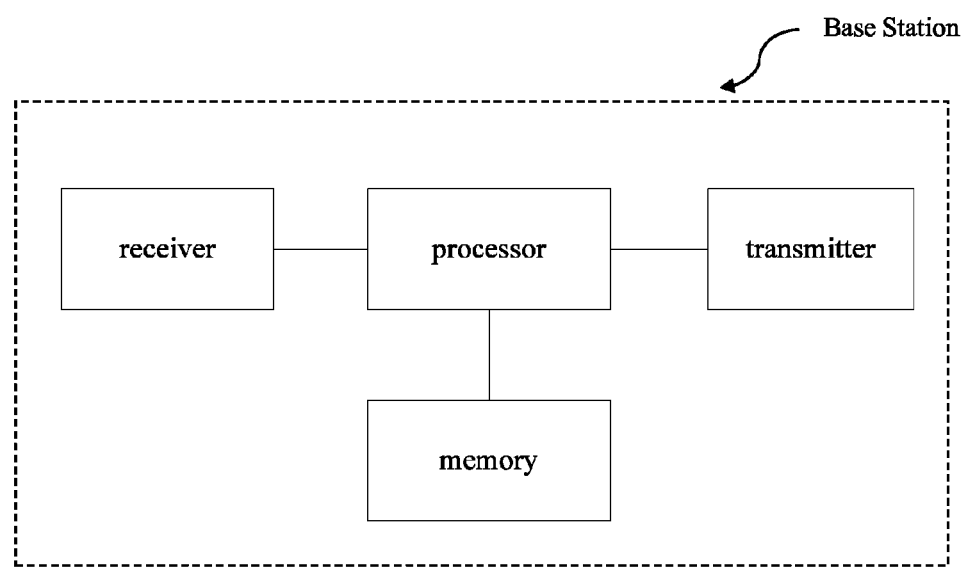
FIG. 18 is a block diagram of a base station according to embodiments of the present invention.

FIG. 18 is an exemplary block diagram of a base station. The base station generally includes a receiver, a transmitter, a memory and a processor coupled with the receiver, the transmitter and the memory. In an embodiment, the receiver receives information of a cooperative base station group of a user terminal. Each base station in the cooperative base station group serves the user terminal. The memory stores program codes for execution by the processor. The processor establishes a common base station group within the cooperative base station group. Each base station in the established common base station group also serves one or more other user terminals. The processor further calculates a first precoding matrix of the user terminal according to information of the common base station group. The first precoding matrix is used by the base stations of the common base station group in preprocessing data streams to the user terminal, so as to eliminate interference between the data streams to the user terminal and data streams to the other user terminals served by the common base station group.

In this embodiment of the present invention, through the above technical solution, user terminal-centered resource scheduling is performed, so as to serve a user of the terminal more effectively by taking the requirements and experience of the user and the current network resource condition into account; real-time update is dynamically performed on a cooperative BS group based on a user terminal-centered cooperative BS transmission policy, to dynamically expand the cooperative BS group, and the user terminals needed to be precoded again due to the joining of a new user terminal are precoded again, so as to support multiple user terminals. The precoding matrix of the MS is calculated according to the common BS group and the channel state information of the MS by scheduling the time-frequency resources, which may effectively eliminate inter-BS interference inside the cooperative BS group and interference at the cooperative BS group edge, so that the user obtains a great cooperation benefit. The user-centered operation reduces the interference of a transmitted signal to other user terminals. The cooperative BS group is divided into the common BS group and the private BS group, and the final precoding matrix of the user terminal is calculated according to the common BS group, which thereby reduces the calculation complexity.

Through the above description of the embodiments, it is apparent to persons skilled in the art that the present invention may be accomplished by software implemented on a necessary hardware platform, and may also be accomplished by hardware, or a combination of both the software and hardware. Therefore, the technical solutions of the present invention or a part that makes contributions to the prior art may be substantially realized by a computer program product. The computer program product comprises a non-transient storage medium, which stores program codes containing several instructions to instruct computer equipment (for example, a personal computer, a server, or network equipment) to perform the method as described in the embodiments of the present invention. The storage medium may be a Random Access Memory (RAM), a memory, a Read Only Memory (ROM), an Electrically Programmable ROM (EPROM), an Electrically Erasable Programmable ROM (EEPROM), a register, a hard disk, a removable magnetic disk, a Compact Disc Read-Only Memory (CD-ROM), or a storage medium of any other forms known in this technical field.

The above embodiments are merely some of the embodiments of the present invention. Persons skilled in the art may make various modifications or variations without departing from the spirit and scope of the present invention based on the disclosure of the application document.

What is claimed is:

1. A method for reducing multi-terminal interference in a cooperative communication system, comprising:
obtaining information of a cooperative base station group of a user terminal, wherein each base station in the cooperative base station group serves the user terminal;

establishing a common base station group within the cooperative base station group, wherein each base station in the established common base station group also serves one or more other user terminals; and calculating, by a base station that serves the user terminal, a first precoding matrix of the user terminal according to information of the common base station group, wherein the first precoding matrix is used by the base stations of the common base station group in preprocessing data streams to the user terminal, so as to eliminate interference between the data streams to the user terminal and data streams to the other user terminals served by the common base station group.

2. The method according to claim 1, further comprising calculating, by the base station that serves the user terminal, a final precoding matrix of the user terminal according to the first precoding matrix of the user terminal and a channel state information matrix of the user terminal, wherein the final precoding matrix of the user terminal is used in preprocessing a data stream to the user terminal, so as to reduce interference between the data stream to the user terminal and other data streams to the user terminal from other base stations in the cooperative base station group.

3. The method according to claim 2, wherein after calculating the final precoding matrix of the user terminal according to the first precoding matrix of the user terminal and the channel state information matrix of the user terminal, the method further comprises:

if the calculation of the final precoding matrix of the user terminal fails, marking the cooperative base station group of the user terminal as a failed cooperative base station group, reobtaining information of a new cooperative base station group of the user terminal that is different from the failed cooperative base station group, and recalculating the final precoding matrix of the user terminal according to the information of the new cooperative base station group.

4. The method according to claim 1, further comprising:
updating the common base station group after a new user terminal starts to use one of the base stations in the cooperative base station group;
determining whether the first precoding matrix of the user terminal needs to be updated according to information of the updated common base station group; and
if the first precoding matrix needs to be updated, updating the first precoding matrix of the user terminal.

5. The method according to claim 4, further comprising:
calculating, by the base station that serves the user terminal, a final precoding matrix of the user terminal according to the first precoding matrix of the user terminal and a channel state information matrix of the user terminal; and
if the first precoding matrix has been updated, updating the final precoding matrix of the user terminal according to the updated first precoding matrix and updating the channel state information matrix of the user terminal,
wherein the final precoding matrix of the user terminal is used in preprocessing a data stream to the user terminal, so as to reduce interference between the data stream to the user terminal and other data streams to the user terminal from other base stations in the cooperative base station group.

6. The method according to claim 1, wherein calculating the first precoding matrix of the user terminal according to the information of the common base station group comprises:

calculating a null space of a channel matrix corresponding to the other user terminals served by the common base station group; and
calculating the first precoding matrix of the user terminal according to the null space.

7. The method according to claim 6, wherein calculating the first precoding matrix of the user terminal according to the information of the common base station group further comprises:
marking the common base station group as a failed common base station group if a preprocessing of data streams to the user terminal fails;
reestablishing a new common base station group that is different from the failed common base station group; and
recalculating the first precoding matrix of the user terminal according to the information of the reestablished new common base station group.

8. The method according to claim 1, further comprising:
receiving cooperation request information of the user terminal, and determining the cooperative base station group of the user terminal according to the cooperation request information; and
updating the cooperative base station group of the user terminal according to a channel quality monitoring result sent by the user terminal.

9. A base station, comprising:
a receiver, configured to receive information of a cooperative base station group of a user terminal, wherein each base station in the cooperative base station group serves the user terminal;
a memory storing program codes for execution by a processor; and
the processor coupled to the receiver and the memory, configured to:
establish a common base station group within the cooperative base station group, wherein each base station in the common base station group also serves one or more other user terminals; and
calculate a first precoding matrix of the user terminal according to information of the established common base station group,
wherein the first precoding matrix is used by the base stations of the common base station group in preprocessing data streams to the user terminal, so as to eliminate interference between the data streams to the user terminal and data streams to the other user terminals served by the common base station group.

10. The base station according to claim 9, wherein the processor is further configured to:
calculate a final precoding matrix of the user terminal according to the first precoding matrix of the user terminal and a channel state information matrix of the user terminal; and
preprocess a data stream to the user terminal using the final precoding matrix of the user terminal, so as to reduce interference between the data stream to the user terminal and other data streams to the user terminal from other base stations in the cooperative base station group.

11. The base station according to claim 10, wherein the processor is further configured to:
mark the common base station group as a failed common base station group if a preprocessing of the data streams to the user terminal fails;
reestablish a new common base station group that is different from the failed common base station group; and recalculate the first precoding matrix of the user terminal according to the information of the reestablished new common base station group.

12. The base station according to claim 10, wherein the processor is further configured to:
after calculating the final precoding matrix of the user terminal according to the first precoding matrix of the user terminal and the channel state information matrix of the user terminal, if the calculation of the final precoding matrix of the user terminal fails, mark the cooperative base station group of the user terminal as a failed cooperative base station group, reobtain information of a new cooperative base station group of the user terminal that is different from the failed cooperative base station group, and recalculate the final precoding matrix of the user terminal according to the information of the new cooperative base station group.

13. The base station according to claim 9, wherein the processor is further configured to:
update the common base station group after a new user terminal starts to use one of the base stations in the cooperative base station group;
determine whether the first precoding matrix of the user terminal needs to be updated according to information of the updated common base station group; and
update the first precoding matrix of the user terminal if the first precoding matrix needs to be updated.

14. The base station according to claim 13, wherein the processor is further configured to:
calculate a final precoding matrix of the user terminal according to the first precoding matrix of the user terminal and a channel state information matrix of the user terminal; and
if the first precoding matrix has been updated, update the final precoding matrix of the user terminal according to the updated first precoding matrix and updating the channel state information matrix of the user terminal,
wherein the final precoding matrix of the user terminal is used in preprocessing a data stream to the user terminal, so as to reduce interference between the data stream to the user terminal and other data streams to the user terminal from other base stations in the cooperative base station group.

15. The base station according to claim 9, wherein the processor is configured to calculate the first precoding matrix by:
calculating a null space of a channel matrix corresponding to other user terminals served by the common base station group; and
calculating the first precoding matrix of the user terminal according to the null space.

16. The base station according to claim 9, wherein the receiver is further configured to receive cooperation request information of the user terminal and a channel quality monitoring result sent by the user terminal,
and wherein the processor is further configured to:
determine the cooperative base station group of the user terminal according to the cooperation request information; and
update the cooperative base station group of the user terminal according to the channel quality monitoring result.

17. A communication system, comprising at least two base stations and one or more user terminals configured to communicate with at least one of the base stations, wherein one of the base stations is configured to:
obtain information of a cooperative base station group of a user terminal, wherein each base station in the cooperative base station group serves the user terminal;
establish a common base station group within the cooperative base station group, wherein each base station in the common base station group also serves one or more other user terminals; and
calculate a first precoding matrix of the user terminal according to information of the established common base station group,
wherein the first precoding matrix is used by the base stations of the common base station group in preprocessing data streams to the user terminal, so as to eliminate interference between the data streams to the user terminal and data streams to the other user terminals served by the common base station group.

18. The system according to claim 17, wherein the one of the base stations is further configured to:
calculate a final precoding matrix of the user terminal according to the first precoding matrix and a channel state information matrix of the user terminal,
wherein the final precoding matrix is used to perform interference preprocessing on information of the user terminal; and
preprocess a data stream to the user terminal, so as to reduce interference between the data streams to the user terminal and other data streams to the user terminal from other base stations in the cooperative base station group.

19. The system according to claim 17, wherein the one of the base stations is further configured to:
update the common base station group after a new user terminal starts to use one of the base stations in the cooperative base station group;
determine whether the first precoding matrix of the user terminal needs to be updated according to information of the updated common base station group; and
updating the first precoding matrix of the user terminal if the first precoding matrix needs to be updated.

20. A computer program product comprising a non-transitory computer readable storage medium storing program code thereon for use by a processor in a base station, the program code comprising:
instructions for obtaining information of a cooperative base station group of a user terminal, wherein each base station in the cooperative base station group serves the user terminal;
instructions for establishing a common base station group within the cooperative base station group, wherein each base station in the common base station group also serves one or more other user terminals; and
instructions for calculating a precoding matrix of the user terminal according to information of the established common base station group,
wherein the precoding matrix is used by the base stations of the common base station group in preprocessing data streams to the user terminal, so as to eliminate interference between the data streams to the user terminal and data streams to the other user terminals served by the common base station group.

* * * * *